United States Patent  (10) Patent No.: US 11,206,534 B2
Lee et al.  (45) Date of Patent: Dec. 21, 2021

(54) METHOD AND APPARATUS FOR MANAGING BUNDLES OF SMART SECURE PLATFORM

(71) Applicant: Samsung Electronics Co., Ltd., Suwon-si (KR)

(72) Inventors: Hyewon Lee, Suwon-si (KR); Kangjin Yoon, Suwon-si (KR); Duckey Lee, Suwon-si (KR); Jonghoe Koo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/667,212

(22) Filed: Oct. 29, 2019

(65) Prior Publication Data

US 2020/0137572 A1 Apr. 30, 2020

(30) Foreign Application Priority Data

Oct. 29, 2018 (KR) .................. 10-2018-0130250

(51) Int. Cl.
*H04M 3/16* (2006.01)
*H04W 12/06* (2021.01)
(Continued)

(52) U.S. Cl.
CPC ............. *H04W 12/06* (2013.01); *H04L 9/32* (2013.01); *H04W 4/50* (2018.02); *H04W 8/183* (2013.01);
(Continued)

(58) Field of Classification Search
CPC ......... H04W 12/06; H04W 4/50; H04W 9/32; H04W 8/183; H04W 8/205; H04W 12/04;
(Continued)

(56) References Cited

U.S. PATENT DOCUMENTS 9,009,475 B2   4/2015 Hauck et al.
9,262,771 B1 * 2/2016 Patel .................. G06Q 30/0237
(Continued)

FOREIGN PATENT DOCUMENTS

EP    2472927 A1    7/2012

OTHER PUBLICATIONS

International Search Report and Written Opinion of the International Searching Authority in connection with International Application No. PCT/KR2019/014078 dated Feb. 4, 2020,12. pages.
(Continued)

*Primary Examiner* — Danh C Le

(57) ABSTRACT

A method, performed by a user equipment (UE), of managing secondary platform bundles (SPBs), includes receiving an end user selection for managing a state of at least one SPB among SPBs installed in a smart secure platform (SSP) module; checking bundle management information required to manage the state of the at least one SPB based on the end user selection; determining whether end user intent confirmation is required to manage the state of the at least one SPB according to the end user selection based on the bundle management information; and managing the state of the at least one SPB based on a result of the determining.

8 Claims, 17 Drawing Sheets

(51) Int. Cl.
  *H04W 12/04* (2021.01)
  *H04W 4/50* (2018.01)
  *H04L 9/32* (2006.01)
  *H04W 8/18* (2009.01)
  *H04W 12/08* (2021.01)
  *H04W 8/20* (2009.01)
  *H04W 12/30* (2021.01)

(52) U.S. Cl.
  CPC ........... *H04W 8/205* (2013.01); *H04W 12/04* (2013.01); *H04W 12/08* (2013.01); *H04W 12/35* (2021.01)

(58) Field of Classification Search
  CPC ............. H04W 12/08; H04M 1/72517; H04M 1/72522; H04L 9/32
  USPC ................................ 455/411, 418, 550.1, 558
  See application file for complete search history.

(56) References Cited

U.S. PATENT DOCUMENTS

| | | | | |
|---|---|---|---|---|
| 9,344,843 | B2 * | 5/2016 | Niedermaier | H04W 4/021 |
| 2011/0013569 | A1 * | 1/2011 | Scherzer | H04W 48/14 |
| | | | | 370/329 |
| 2011/0165896 | A1 * | 7/2011 | Stromberg | G06Q 20/3226 |
| | | | | 455/466 |
| 2013/0152159 | A1 | 6/2013 | Holtmanns et al. | |
| 2013/0218601 | A1 * | 8/2013 | Webb | G07F 7/1008 |
| | | | | 705/3 |
| 2013/0290213 | A1 * | 10/2013 | Deasaro | G06Q 10/06 |
| | | | | 705/345 |
| 2014/0123307 | A1 * | 5/2014 | Jung | H04L 41/00 |
| | | | | 726/27 |
| 2014/0298353 | A1 * | 10/2014 | Hsu | G06F 9/54 |
| | | | | 719/313 |
| 2015/0050907 | A1 * | 2/2015 | Rudow | H04W 4/90 |
| | | | | 455/404.2 |
| 2015/0073651 | A1 * | 3/2015 | Nagara | G06F 9/451 |
| | | | | 701/36 |
| 2015/0084745 | A1 * | 3/2015 | Hertz | H04W 4/029 |
| | | | | 340/10.3 |
| 2016/0239733 | A1 * | 8/2016 | Hertz | H04W 4/02 |
| 2016/0352816 | A1 * | 12/2016 | Xiao | H04L 67/00 |
| 2017/0222991 | A1 | 8/2017 | Yang | |
| 2017/0280317 | A1 * | 9/2017 | Tagg | H04W 8/26 |
| 2017/0315661 | A1 * | 11/2017 | Zhao | G06F 3/041 |
| 2018/0005209 | A1 * | 1/2018 | Ranganathan | G06Q 20/12 |
| 2018/0092011 | A1 * | 3/2018 | Lin | H04W 36/0038 |
| 2018/0232592 | A1 * | 8/2018 | Stewart | G08B 13/19606 |
| 2018/0234550 | A1 * | 8/2018 | Lifson | H04M 7/006 |
| 2018/0242138 | A1 * | 8/2018 | Chen | H04W 8/183 |
| 2018/0299836 | A1 * | 10/2018 | Qian | G04G 9/007 |
| 2019/0018504 | A1 * | 1/2019 | Lim | G06F 3/038 |
| 2019/0313246 | A1 * | 10/2019 | Nix | H04W 12/002 |
| 2019/0324735 | A1 * | 10/2019 | Park | G06F 8/61 |
| 2019/0327125 | A1 * | 10/2019 | Mcchord | G06F 11/1464 |
| 2019/0327605 | A1 * | 10/2019 | Fan | H04W 8/183 |
| 2019/0339824 | A1 * | 11/2019 | Hamedi | G06F 3/0482 |
| 2019/0340879 | A1 * | 11/2019 | Williams | G07F 17/3225 |
| 2020/0020440 | A1 * | 1/2020 | Beinhauer | G16H 40/20 |
| 2020/0020753 | A1 * | 1/2020 | Zhang | H01L 27/3234 |
| 2020/0045544 | A1 * | 2/2020 | Yu | H04W 12/03 |
| 2020/0084622 | A1 * | 3/2020 | Yoon | H04L 9/0844 |
| 2020/0092095 | A1 * | 3/2020 | Yang | H04L 9/3263 |
| 2020/0167760 | A1 * | 5/2020 | Makhotin | G06Q 20/401 |
| 2020/0211347 | A1 * | 7/2020 | Stewart | G08B 13/19606 |
| 2020/0219084 | A1 * | 7/2020 | Nam | G06Q 20/3574 |
| 2020/0228488 | A1 * | 7/2020 | Xu | H04L 61/1588 |
| 2020/0280839 | A1 * | 9/2020 | Ahmed | H04W 4/60 |
| 2020/0314635 | A1 * | 10/2020 | Park | H04W 12/35 |
| 2020/0371777 | A1 * | 11/2020 | Zhang | H04L 9/06 |
| 2021/0084485 | A1 * | 3/2021 | Roy | H04W 4/021 |

OTHER PUBLICATIONS

ETSI TS 103 465 V15.0.0 (May 2019), "Smart Cards; Smart Secure Platform (SSP); Requirements Specification," Technical Specification, May 2019, 52 pages.
"Approved minutes 12th meeting ad hoc multi-stakeholder group on Mobile Contactless SEPA Cards Interoperability Implementation Guidelines (MCP IIGs)," MSG MCP 008-2018, Version 1.0, May 12, 2018, 11 pages.
"Terms of Reference—Specialist Task Force STF CG (TC SCP/WG TEC) "Smart Secure Platform"," Tdoc SCP(17) 000188, ETSI TC SCP Meeting #81, Yokohama, Japan, Nov. 15-17, 2017, 10 pages.

* cited by examiner

FIG. 9

| Identifier (911) | Visible to End User (913) | Command (915) | Local Management (917) | | | Remote Management (919) | | |
|---|---|---|---|---|---|---|---|---|
| | | | Allowed (917a) | End User Intent (917b) | End User Intent Confirmation (917c) | Allowed (919a) | End User (919b) | Subscriber Intent Verification (919c) |
| Consumer's Telecom Bundle | Yes | Install | Yes | Not Required | Required | No | N/A | N/A |
| | | Enable | Yes | Required | Yes or No | Yes | Accept or Reject | Not Required |
| | | Disable | Yes | Required | Not Required | Yes | Required | Not Required |
| | | Delete | Yes | Required | Fingerprint | Yes | PIN | Credential Key |
| | | Update | No | N/A | PIN | Yes | Fingerprint | Not Required |
| M2M's Telecom Bundle | No | Install | No | N/A | N/A | Yes | Not Required | Required |
| | | Enable | No | N/A | N/A | Yes | Not Required | Not Required |
| | | Disable | No | N/A | N/A | Yes | Not Required | Not Required |
| | | Delete | No | N/A | N/A | Yes | Not Required | Signed Token |
| | | Update | No | N/A | N/A | Yes | Not Required | Not Required |

910

METHOD AND APPARATUS FOR MANAGING BUNDLES OF SMART SECURE PLATFORM

CROSS-REFERENCE TO RELATED APPLICATION

This application is based on and claims priority under 35 U.S.C. § 119 to Korean Patent Application No. 10-2018-0130250, filed on Oct. 29, 2018, in the Korean Intellectual Property Office, the disclosure of which is incorporated by reference herein in its entirety.

BACKGROUND

1. Field

The disclosure relates to a method and apparatus for managing bundles of a smart secure platform (SSP) in a mobile communication system.

2. Description of Related Art

To meet the increasing demand for wireless data traffic due to the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60-GHz band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (Cloud-RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to IoT networks. For example, technologies related to sensor networks, M2M communication, and MTC are being implemented by using 5G communication technology including beamforming, MIMO, and array antennas. The application of cloud RAN as the above-described big data processing technology may be an example of convergence of 5G communication technology and IoT technology. Because various services may be provided due to the development of mobile communication systems, methods capable of effectively providing these services are required.

SUMMARY

Provided are an apparatus and method capable of effectively providing services in a mobile communication system.

Additional aspects will be set forth in part in the description which follows and, in part, will be apparent from the description, or may be learned by practice of the presented embodiments of the disclosure.

According to an embodiment of the disclosure, a method, performed by a user equipment (UE), of managing secondary platform bundles (SPBs) includes receiving an end user selection for managing a state of at least one SPB among SPBs installed in a smart secure platform (SSP) module; checking bundle management information required to manage the state of the at least one SPB, based on the end user selection; determining whether end user intent confirmation is required to manage the state of the at least one SPB according to the end user selection, based on the bundle management information; and managing the state of the at least one SPB, based on a result of the determining.

The managing of the state of the at least one SPB may include checking an end user consent to manage the state of the at least one SPB, when the result of the determining indicates that the end user intent confirmation is required; and determining the state of the at least one SPB, based on a result of the checking of the end user consent.

The managing of the state of the at least one SPB may include enabling, disabling, or deleting the at least one SPB.

The managing of the state of the at least one SPB may include managing the state of the at least one SPB, based on the bundle management information when the result of the determining indicates that the end user intent confirmation is not required.

The bundle management information may be received from an external server or may be pre-stored in the at least one SPB.

The bundle management information may include an indicator indicating whether the end user intent confirmation is required, or means information for the end user intent confirmation.

The indicator may include a certain string corresponding to an enabled state, a disabled state, or a deleted state of the at least one SPB the end user intent confirmation.

The means information may include biometric information, identification information, or configuration information of an end user, and the method may further include receiving an end user input, based on the means information when the result of the determining indicates that the end user intent confirmation is required; and managing the state of the at least one SPB, based on the received end user input.

The at least one SPB may be identified by a family identifier, based on a function related to the at least one SPB.

The method may further include identifying a telecom SPB to access a mobile communication network, based on the family identifier, wherein the at least one SPB is the telecom SPB identified based on the family identifier.

According to another embodiment of the disclosure, a user equipment (UE) for managing secondary platform bundles (SPBs) includes a transceiver; a smart secure platform (SSP) module; and at least one processor connected to the transceiver and configured to: receive an end user selection for managing a state of at least one SPB among SPBs installed in the SSP module; check bundle management information required to manage the state of the at least one SPB, based on the end user selection; determine whether end user intent confirmation is required to manage the state of the at least one SPB according to the end user selection, based on the bundle management information; and manage the state of the at least one SPB, based on a result of the determining.

The at least one processor may be further configured to: check an end user consent to manage the state of the at least one SPB, when the result of the determining indicates that the end user intent confirmation is required; and determine the state of the at least one SPB, based on a result of the checking of the end user consent.

The at least one processor may be further configured to enable, disable, or delete the at least one SPB.

The at least one processor may be further configured to manage the state of the at least one SPB, based on the bundle management information when the result of the determining indicates that the end user intent confirmation is not required.

The bundle management information may be received from an external server or may be pre-stored in the at least one SPB.

The bundle management information may include an indicator indicating whether the end user intent confirmation is required, or means information for checking the end user intent confirmation.

The indicator may include a certain string corresponding to an enabled state, a disabled state, or a deleted state of the at least one SPB to check the end user intent confirmation.

The means information may include biometric information, identification information, or configuration information of an end user, and the at least one processor may be further configured to: receive an end user input, based on the means information when the result of the determining indicates that the end user intent confirmation is required; and manage the state of the at least one SPB, based on the received end user input.

The at least one SPB may be identified by a family identifier, based on a function related to the at least one SPB.

The at least one processor may be further configured to identify a telecom SPB to access a mobile communication network, based on the family identifier, and the at least one SPB may be the telecom SPB identified based on the family identifier.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a schematic diagram illustrating an example of configuring bundle policies, according to an embodiment of the disclosure;

DETAILED DESCRIPTION

Figure 1:
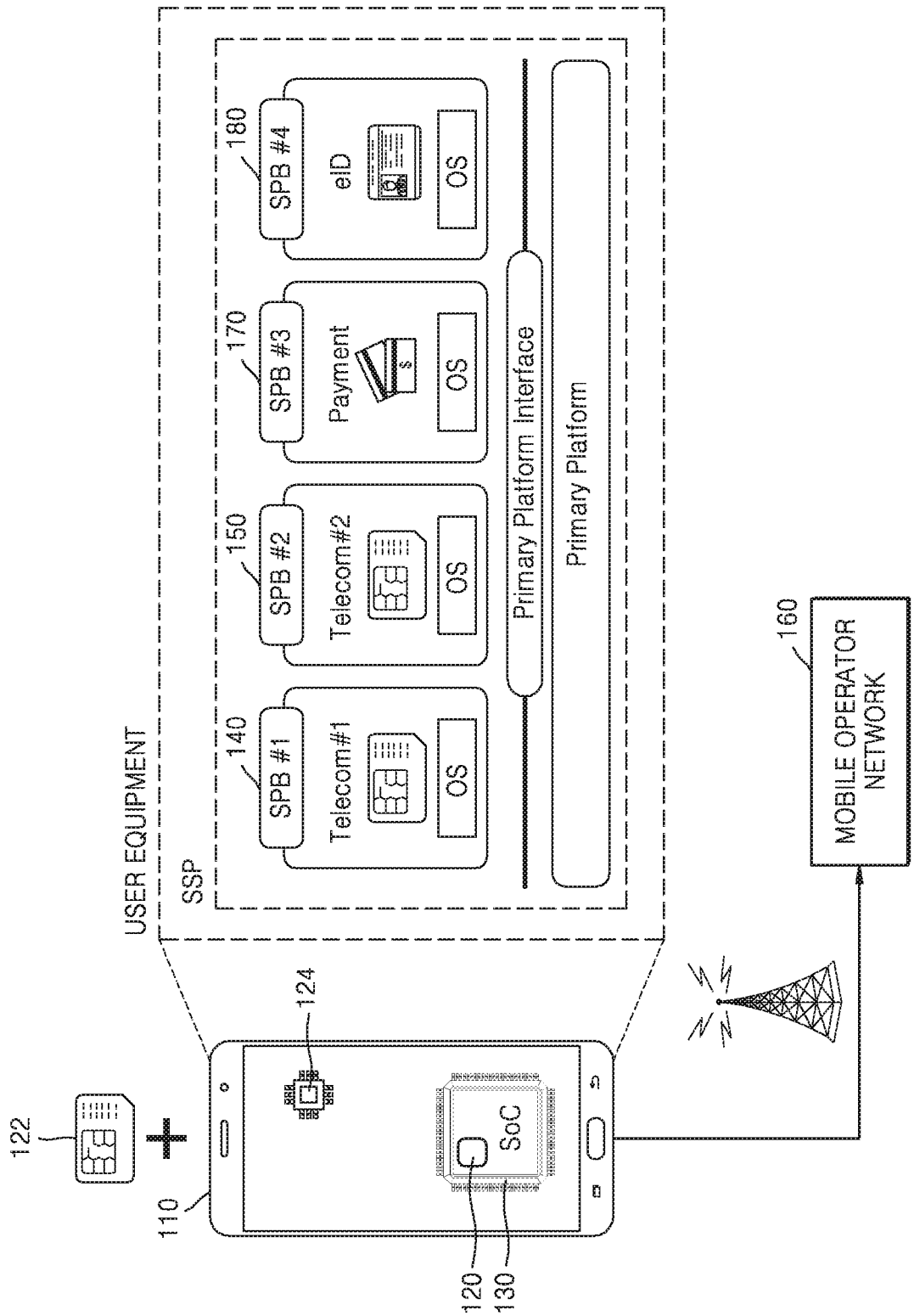
FIG. 1 is a schematic diagram illustrating a mobile communication network connection method of a user equipment using a smart secure platform (SSP) having installed therein a telecom bundle including a profile, according to an embodiment of the disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the disclosure will be described in detail by explaining embodiments of the disclosure with reference to the attached drawings.

In describing embodiments of the disclosure, technical contents that are well-known in the art and not directly related to the disclosure will not be described. By omitting unnecessary descriptions, the subject matter of the disclosure will not be obscured and may be more clearly explained.

For the same reason, some elements may be exaggerated, omitted, or schematically illustrated in the drawings. In addition, the size of each element does not completely reflect a real size thereof. In the drawings, like reference numerals denote like elements. Throughout the disclosure, the expression "at least one of a, b or c" indicates only a, only b, only c, both a and b, both a and c, both b and c, all of a, b, and c, or variations thereof. In the disclosure, a controller may also be referred to as a processor.

Throughout the specification, a layer (or a layer apparatus) may also be referred to as an entity.

One or more embodiments of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein, rather, these embodiments of the disclosure are provided so that this disclosure will be thorough and complete and will fully convey the concept of the disclosure to one of ordinary skill in the art, and the disclosure will only be defined by the appended claims. Throughout the disclosure, like reference numerals denote like elements.

It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a part of a module, segment, or code that includes one or more executable instructions for executing specified logical function(s). It should also be noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs certain functions. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card.

Specific terms used herein are provided for a better understanding of the disclosure, and may be modified to other forms without departing from the scope of the disclosure.

A secure element (SE) refers to a single-chip security module storing security information (e.g., a mobile communication network access key, user identification information such as an identification or a passport, credit card information, or an encryption key) and including and capable of operating a control module using the stored security information (e.g., a network access control module such as a universal subscriber identity module (USIM), an encryption module, or a key generation module). The SE may be used for various electronic devices (e.g., smartphones, tablets, wearable devices, automobiles, and Internet of things (IoT) devices) to provide a security service (e.g., mobile communication network access, payment, or user authentication) via the control module by using the security information.

The SE may be divided into, for example, a universal integrated circuit card (UICC), an embedded secure element (eSE), and a smart secure platform (SSP) in which the UICC is integrated with the eSE, and be subdivided, based on a method for connection to or installation in an electronic device, into a removable SE, an embedded SE, and an integrated SE integrated into a specific device or system-on-chip (SoC).

The UICC is a smart card inserted into, for example, a mobile communication device and is also called a UICC card. The UICC may include an access control module for accessing a network of a mobile operator. Examples of the access control module include a universal subscriber identity module (USIM), a subscriber identity module (SIM), and an Internet protocol (IP) multimedia service identity module (ISIM). A UICC including the USIM is generally called a USIM card. Likewise, a UICC including the SIM module is generally called a SIM card. The SIM module may be installed when the UICC is manufactured, or a user may download a SIM module of a desired mobile communication service in the UICC card at a desired timing. A plurality of SIM modules may be downloaded and installed in the UICC card, and at least one of the SIM modules may be selected and used. The UICC card may be embedded or not embedded in a user equipment. A UICC embedded in the user equipment is called an embedded UICC (eUICC) and, particularly, a UICC integrated into an SoC including a communication processor or an application processor of the user equipment, or a single processor structure in which the two processors are integrated is called an integrated UICC (iUICC). In general, the eUICC or the iUICC may refer to a UICC card embedded in the user equipment and capable of remotely downloading and selecting a SIM module. As used herein, a UICC card capable of remotely downloading and selecting a SIM module is called an eUICC or iUICC. That is, a UICC card capable of remotely downloading and selecting a SIM module and embedded or not embedded in a user equipment is called an eUICC or iUICC. The downloaded SIM module information is called an eUICC or iUICC profile, or more simply, a profile.

The eSE refers to an embedded SE embedded in an electronic device. In general, the eSE may be produced exclusively for a user equipment manufacturer based on a request thereof, and include an operating system and a framework. The eSE may remotely download and install an applet-type service control module therein and be used for various security services, e.g., an e-wallet, ticketing, an e-passport, and a digital key. As used herein, a single-chip SE attached to an electronic device to remotely download and install a service control module therein is called an eSE.

The SSP may integrally support UICC and eSE functions in a single chip, and be divided into a removable SSP (rSSP), an embedded SSP (eSSP), and an integrated SSP (iSSP) integrated into a SoC. The SSP may include one primary platform (PP) and one or more secondary platform bundles (SPBs) operating on the PP, and the PP may include at least one of a hardware platform or a low-level operating system (LLOS) and each SPB may include at least one of a high-level operating system (HLOS) or applications driven on the HLOS. The SPB may be simply called a bundle. The bundle may access resources, e.g., a central processing unit (CPU) or a memory, of the PP via a primary platform interface (PPI) provided by the PP, and thus be driven on the PP. The bundle may include a communication application such as a SIM, USIM, or ISIM, and also include various applications such as an e-wallet, ticketing, an e-passport, and a digital key. As used herein, the SSP may also be called a smart secure medium.

The SSP may be used as the above-described UICC or eSE based on a remotely downloaded and installed bundle, or include UICC and eSE functions by installing and simultaneously operating a plurality of bundles in a single SSP. That is, when a bundle including a profile operates, the SSP may be used as the UICC to access a network of a mobile operator. Such a UICC bundle may operate by remotely downloading and selecting at least one profile like the eUICC or iUICC. When a bundle including a service control module including an application capable of providing a service such as an e-wallet, ticketing, an e-passport, or a digital key operates on the SSP, the SSP may be used as the eSE. A plurality of service control modules may be integrally installed and operated in one bundle, or be installed and operated in independent bundles.

As used herein, the SSP is a chip-type security module capable of integrally supporting UICC and eSE functions in a single chip and dividable into an rSSP, an eSSP, and an iSSP integrated into a SoC. The SSP may download and install the bundle from an external bundle management server (e.g., an SPB manager (SPBM)) by using over the air (OTA) technology.

The method of downloading and installing the bundle in the SSP by using OTA technology may be equally applied to an rSSP attachable to and detachable from a device, an eSSP installed in a user equipment, and an iSSP included in a SoC installed in a device.

As used herein, the term "UICC" may be used interchangeably with the term "SIM", and the term "eUICC may be used interchangeably with the term "eSIM".

As used herein, an SPB may be a bundle driven on a PP of an SSP by using resources of the PP and, for example, a UICC bundle may refer to a software-type package of an application, a file system, an authentication key value, etc., which are generally stored in a UICC, and a HLOS for operating the same.

As used herein, a USIM profile may refer to a profile, or a software-type package of information included in a USIM application in the profile.

As used herein, an operation of enabling a bundle by a user equipment or an external server may refer to an operation of changing a corresponding profile to an enabled state in such a manner that the device may receive a service provided by the bundle (e.g., a communication service, a credit card payment service, or a user authentication service via a mobile operator). When enabled, the bundle may be expressed as an "enabled bundle". An enabled bundle may be encrypted and stored in the SSP or in an external storage space.

The enabled bundle may be changed to an active state based on an input from outside the bundle (e.g., a user input, a push, a request of an application in the user equipment, an authentication request of the mobile operator, or a PP management message) or an operation in the bundle (e.g., a timer or polling). The active bundle may mean that the bundle is loaded from inside the SSP or from the external storage space to a driving memory in the SSP, security information is processed using a secure CPU in the SSP, and a security service is provided to the user equipment.

As used herein, an operation of disabling a bundle by a user equipment or an external server may refer to an operation of changing the bundle to a disabled state in such a manner that the device may not receive a service provided by the bundle. When disabled, a corresponding profile may be expressed as a "disabled bundle". An enabled bundle may be encrypted and stored in the SSP or in an external storage space.

As used herein, an operation of deleting a bundle by a user equipment or an external server may refer to an operation of changing the bundle to a deleted state in such a manner that the device or the external server may no longer enable or disable the bundle. When deleted, the bundle may be expressed as a "deleted bundle".

As used herein, a bundle management server may have a function of generating a bundle based on a request of a service provider or another bundle management server, encrypting the generated bundle, generating a bundle remote management command, or encrypting the generated bundle remote management command. The bundle management server providing the above-described function may be expressed as at least one of a SPB manager (SPBM), a remote bundle manager (RBM), an image delivery server (IDS), a subscription manager data preparation (SM-DP), an SM-DP plus (SM-DP+), a manager bundle server, a managing SM-DP+, a bundle encryption server, a bundle generation server, a bundle provisioner (BP), a bundle provider, or a bundle provisioning credential (BPC) holder.

As used herein, a bundle management server may function to download, install, or update a bundle in an SSP and manage a key and a certificate for remotely managing the state of the bundle. The bundle management server providing the above-described function may be expressed as at least one of an SPBM, an RBM, an IDS, a subscription manager secure routing (SM-SR), an SM-SR plus (SM-SR+), an off-card entity of an eUICC profile manager, a profile management credential (PMC) holder, or an eUICC manager (EM).

As used herein, a mediation server may be expressed as at least one of an SPBM, an RBM, an SPB discovery sever (SPBDS), a bundle discovery sever (BDS), a subscription manager discovery service (SM-DS), a discovery service (DS), a root SM-DS, or an alternative SM-DS. The mediation server may receive an event register request from one or more bundle management servers or mediation servers. One or more mediation servers may be used in combination and, in this case, a first mediation server may receive an event register request not only from a bundle management server but also from a second mediation server. The function of the mediation server may be integrated with that of the bundle management server.

As used herein, the bundle management server may collectively refer to a function of generating, encrypting, and transmitting a bundle or a bundle remote management command, and a function of configuring an SSP and managing an installed bundle. The bundle management server may also function as the mediation server. Therefore, in various embodiments of the disclosure described below, operations of the bundle management server and the mediation server may be performed by one bundle management server. Alternatively, the functions may be performed by a plurality of separate bundle management servers. In the following description, the bundle management server or the mediation server may be expressed as a bundle server. The bundle server may be one of the bundle management server and the mediation server, or include both of the bundle management server and the mediation server.

As used herein, the bundle management server and the mediation server may be called an SPBM or an RBM. The bundle server may also be called the bundle management server.

As used herein, the term "user equipment" may refer to a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, or a mobile device, and the device may also be called other names. Various examples of the user equipment include cellular phones, smartphones having a wireless communication function, personal digital assistants (PDAs) having a wireless communication function, wireless modems, portable computers having a wireless communication function, photographing devices, e.g., digital cameras, having a wireless communication function, gaming devices having a wireless communication function, music-recordable and -reproducible home appliances having a wireless communication function, Internet home appliances capable of wireless Internet access and browsing, and portable units or devices having a combination of functions of the above-mentioned devices. The user equipment may include a machine to machine (M2M) device or a machine type communication (MTC) device, but is not limited thereto. As used herein, the user equipment may also be called an electronic device.

An SSP capable of downloading and installing a bundle may be integrated into the electronic device. When the SSP is not integrated into the electronic device, an SSP physically separate from the electronic device may be inserted into and connected to the electronic device. For example, the SSP may be inserted into the electronic device in the form of a card. For example, the electronic device may include a user equipment and, in this case, the user equipment may be a device including an SSP capable of downloading and installing a bundle. The SSP may be integrated into the user equipment but, when the SSP is separate from the user equipment, the SSP may be inserted into and connected to the user equipment.

The user equipment or the electronic device may include software or an application installed in the user equipment or the electronic device to control the SSP. The software or the application may also be called, for example, a local bundle assistant (LBA) or a local bundle manager (LBM).

As used herein, a bundle identifier may include a bundle ID (or SPB ID), a bundle family ID (or SPB family ID), a bundle matching ID, or an event ID. The bundle ID (or SPB ID) may refer to a unique identifier of each bundle. The bundle family ID may refer to an identifier for identifying the type of a bundle (e.g., a telecom bundle for accessing a mobile operator network). The bundle identifier may be used as a bundle index value by a bundle management server. As used herein, an SSP ID may be a unique identifier of an SSP integrated into a user equipment, and may also be called an SSPID. As in an embodiment of the disclosure, when an SSP chip is not separate from a user equipment, the SSP ID may serve as a user equipment ID. The SSP ID may refer to a specific bundle ID (or SPB ID) in the SSP. In more detail, the SSP ID may refer to a bundle ID of a management bundle or a loader (or SPB loader (SPBL)) for installing and managing enabling, disabling, and deletion of another bundle in an SSP. The SSP may have a plurality of SSP IDs, and the plurality of SSP IDs may be values derived from a single unique SSP ID.

As used herein, a loader (or SPBL) may refer to a management bundle for installing and managing enabling, disabling, and deletion of another bundle in an SSP. An LBA of a user equipment or a remote server may install, enable, disable, or delete a specific bundle via the loader. The loader may also be called an SSP. The loader may also be called an LBA.

As used herein, a bundle provisioning credential (BPC) may be a means used for mutual authentication between a bundle management server and an SSP, bundle encryption, and signature. The BPC may include at least one of a symmetric key, a Rivest-Shamir-Adleman (RSA) certificate and a private key, an elliptic curve cryptography (ECC) certificate and a private key, or a root certification authority (CA) and a certificate chain. When a plurality of profile management servers are present, different BPCs for the plurality of profile management servers may be stored in the SSP or be used.

As used herein, a profile management credential (PMC) may be a means used for mutual authentication between a profile management server and an eUICC, transmit data encryption, and signature. The PMC may include at least one of a symmetric key, an RSA certificate and a private key, an ECC certificate and a private key, or a root CA and a certificate chain. When a plurality of profile management servers are present, different PMCs for the plurality of profile management servers may be stored in the eUICC or be used.

As used herein, an event may be a term collectively indicating bundle download, remote bundle management, and another bundle or SSP management/processing command. The event may also be called a remote bundle provisioning (RBP) operation or an event record, and each event may be indicated by an event ID (or EventID), a matching ID (or MatchingID), or data including at least one of an address (e.g., a fully qualified domain name (FQDN), an IP address, or a uniform resource locator (URL)) of a bundle management server or a mediation server having the event stored therein, or an ID of each server. Bundle download may be used interchangeably with bundle installation. An event type may be used as a term indicating whether a specific event corresponds to bundle download, remote bundle management (e.g., delete, enable, disable, replace, or update), or another bundle or SSP management/processing command, and may also be called, for example, an operation type (or OperationType), an operation class (or OperationClass), an event request type, an event class, or an event request class.

As used herein, a bundle image (or an image) may be used interchangeably with a bundle or used as a term indicating a data object of a specific bundle, and may also be called a bundle tag-length-value (TLV) or a bundle image TLV. When the bundle image is encrypted using an encryption parameter, the bundle image may be called a protected bundle image (PBI)) or a PBI TLV. When the bundle image is encrypted using an encryption parameter decryptable only by a specific SSP, the bundle image may be called a bound bundle image (BBI) or a BBI TLV. The bundle image TLV may be a data set for expressing profile information in a tag-length-value (TLV) format.

As used herein, local bundle management (LBM) may also be called bundle local management, local management, a local management command, a local command, an LBM package, a bundle local management package, a local management package, a local management command package, or a local command package. LBM may be used to install an arbitrary bundle, change the state (e.g., enabled, disabled, or deleted) of a specific bundle, or update the content of a specific bundle (e.g., a bundle nickname or bundle metadata) via, for example, software installed in a user equipment. LBM may include one or more local management commands and, in this case, the local management commands may be directed to the same or different bundles.

As used herein, remote bundle management (RBM) may also be called bundle remote management, remote management, a remote management command, a remote command, an RBM package, a bundle remote management package, a remote management package, a remote management command package, or a remote command package. RBM may be used to install an arbitrary bundle, change the state (e.g., enabled, disabled, or deleted) of a specific bundle, or update the content of a specific bundle (e.g., a bundle nickname or bundle metadata). RBM may include one or more remote management commands and the remote management commands may be directed to the same or different bundles.

As used herein, a target bundle may be used as a term indicating a bundle to which a local or remote management command is directed.

As used herein, bundle rules may be used as a term indicating information required to be checked by a user equipment to locally or remotely manage a target bundle. The bundle rules may be used interchangeably with a term such as bundle policies, rules, or policies.

As used herein, a subscriber may be used as a term indicating a service provider who owns a user equipment, or an end user who owns a user equipment. In general, the former may be called an M2M device, and the latter may be called a consumer device. The M2M device may refer to a user equipment not owned by an end user but rented or leased by the end user from a service provider and, in this case, the end user may be different from or the same as the service provider.

As used herein, a subscriber intent may be used as a term collectively indicating intents of a subscriber to locally and remotely manage a bundle. For local management, the subscriber intent may be used as a term indicating an end user intent and, for remote management, the subscriber intent may be used as a term indicating a service provider intent.

As used herein, an end user consent may be used as a term indicating whether an end user accepts local or remote management.

As used herein, a certificate or a digital certificate may refer to a digital certificate used for mutual authentication based on an asymmetric key including a pair of a public key (PK) and a secret key (SK). Each certificate may include one or more PKs, a PK identifier (PKID) corresponding to each PK, and an ID and a digital signature of a certificate issuer (CI) who has issued the certificate. The CI may also be called a certification issuer, a certificate authority (CA), or a certification authority. As used herein, a PK and a PKID may be used interchangeably with a specific PK or a certificate including the PK, a part of a specific PK or a part of a certificate including the PK, an operation result value (e.g., a hash value) of a specific PK or an operation result value (e.g., a hash value) of a certificate including the PK, an operation result value (e.g., a hash value) of a part of a specific PK or an operation result value (e.g., a hash value) of a part of a certificate including the PK, or a storage space in which data is stored.

When certificates (primary certificates) issued by one CI are used to issue other certificates (secondary certificates) or the secondary certificates are used to hierarchically issue tertiary or further certificates, correlations among the certificates may be called a certificate chain or a certificate hierarchy and, in this case, a CI certificate initially used to issue the certificates may be called, for example, a root of certificate, a root certificate, a root CI, root CI certificate, a root CA, or a root CA certificate.

As used herein, a service provider may refer to a company for requesting a bundle management server to generate a bundle, and providing a service via the bundle to a user equipment. For example, the service provider may refer to a mobile operator for providing a network access service via a bundle including a communication application, and collectively indicate a business supporting system (BSS), an operational supporting system (OSS), a point of sale (POS) terminal, and other information technology (IT) systems of the mobile operator. The service provider is not limited to representing one specific company and may be used as a term indicating an association or consortium of one or more companies or a representative of the association or consortium. The service provider may also be called, for example, an operator (or OP or Op.), a bundle owner (BO), or an image owner (IO), and each service provider may configure or receive allocation of at least one name and/or object identifier (OID). When the service provider indicates an association, consortium, or representative of one or more companies, a name or OID of an arbitrary association, consortium, or representative may be a name or OID shared by all companies belonging to the association or consortium or all companies cooperating with the representative.

As used herein, authentication and key agreement (AKA) may refer to an authentication algorithm for accessing 3GPP and 3GPP2 networks.

As used herein, K (or a value K) may be an encryption key value stored in an eUICC used for an AKA authentication algorithm.

As used herein, OPc may be a parameter value stored in an eUICC used for an AKA authentication algorithm.

As used herein, a network access application (NAA) may be an application program stored in a UICC to access a network, e.g., USIM or ISIM. The NAA may also be a network access module.

As used herein, a telecom bundle may be a bundle including at least one NAA or having a function of remotely downloading and installing at least one NAA. The telecom bundle may include a telecom bundle ID indicating the telecom bundle.

In the following description of the disclosure, a detailed description of known functions and configurations incorporated herein will be omitted when it may make the subject matter of the disclosure unclear.

A method and apparatus for installing and managing bundles online via a remote server, according to various embodiments of the disclosure, will now be described.

According to embodiments of the disclosure, an apparatus and method capable of remotely installing a control module in a security module installed in an electronic device, and providing a security service (e.g., mobile communication network access, payment, user authentication, or a digital key) via the control module by using the security information stored in the security module.

FIG. 1 is a schematic diagram illustrating a mobile communication network connection method of a user equipment using an SSP 120 having installed therein a telecom bundle including a profile, and operations of various types of bundles, according to an embodiment of the disclosure.

As illustrated in FIG. 1, the SSP 120 may be integrated into an SoC 130 of a user equipment 110. In this case, the SoC 130 may be a communication processor, an application processor, or a processor in which the two processors are integrated. The SSP 120 may be replaced by an rSSP 122 provided as an independent chip not integrated into the SoC 130, or an eSSP 124 previously embedded in the user equipment 110.

A bundle including a profile means that it includes 'access information' usable to access a specific mobile operator. For example, the access information may include a subscriber identifier such as an international mobile subscriber identity (IMSI), and a value K or Ki required together with the subscriber identifier for network authentication.

The user equipment 110 may perform authentication with an authentication system (e.g., a home location register (HLR)) of a mobile operator or an authentication center (AuC) by using at least one of telecom bundles 140 and 150 installed in the SSP 120. For example, the authentication process may be an AKA process. When successfully authenticated, the user equipment 110 may use a mobile communication service, e.g., phone calling or use of mobile data, by using a mobile operator network 160 of a mobile communication system. The telecom bundles 140 and 150 may store different pieces of authentication information, and the user equipment 110 may use a mobile communication network by operating the two bundles simultaneously or in a time-division manner based on a configuration.

The user equipment 110 may use an online payment service via an application of the user equipment 110 or an offline payment service via an external credit card POS device by using a payment bundle 170 installed in the SSP 120, and use an authentication service to authenticate an identity of an owner of the user equipment 110 by using an e-ID bundle 180.

Figure 2:
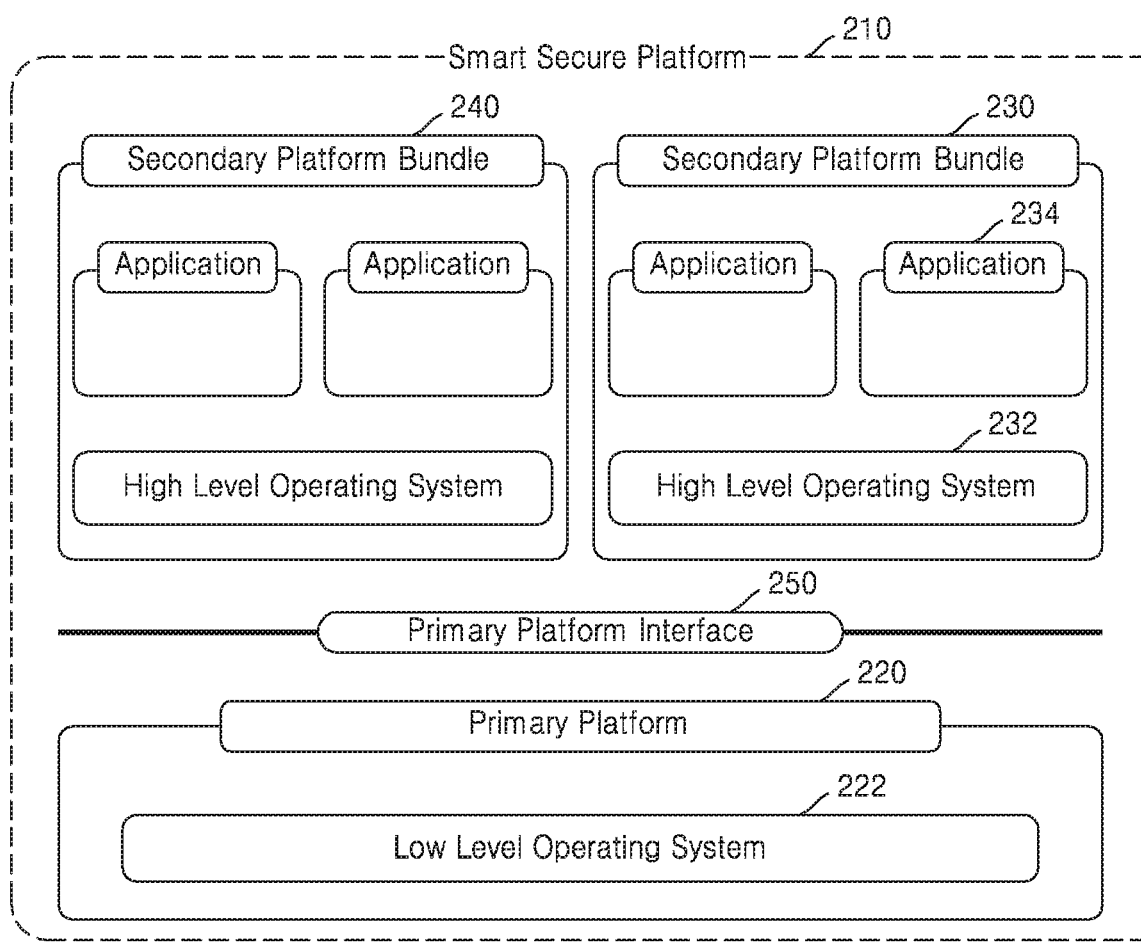
FIG. 2 is a conceptual diagram illustrating the internal structure of an SSP according to an embodiment of the disclosure.

FIG. 2 is a conceptual diagram illustrating the internal structure of an SSP 210 according to an embodiment of the disclosure. The SSP 210 may correspond to the SSP 120 of FIG. 1, and thus a repeated description therebetween will not be provided herein.

In FIG. 2, the SSP 210 may include one PP 220 and one or more SPBs 230 and 240 operating on the PP 220. The PP 220 may include hardware (not shown) and at least one LLOS 222. The SPB 230 may include an HLOS 232 and one or more applications 234 operating on the HLOS 232. Each of the SPBs 230 and 240 may access resources, e.g., a CPU or a memory, of the PP 220 by using a PPI 250, and thus be driven in the SSP 210.

Figure 3:
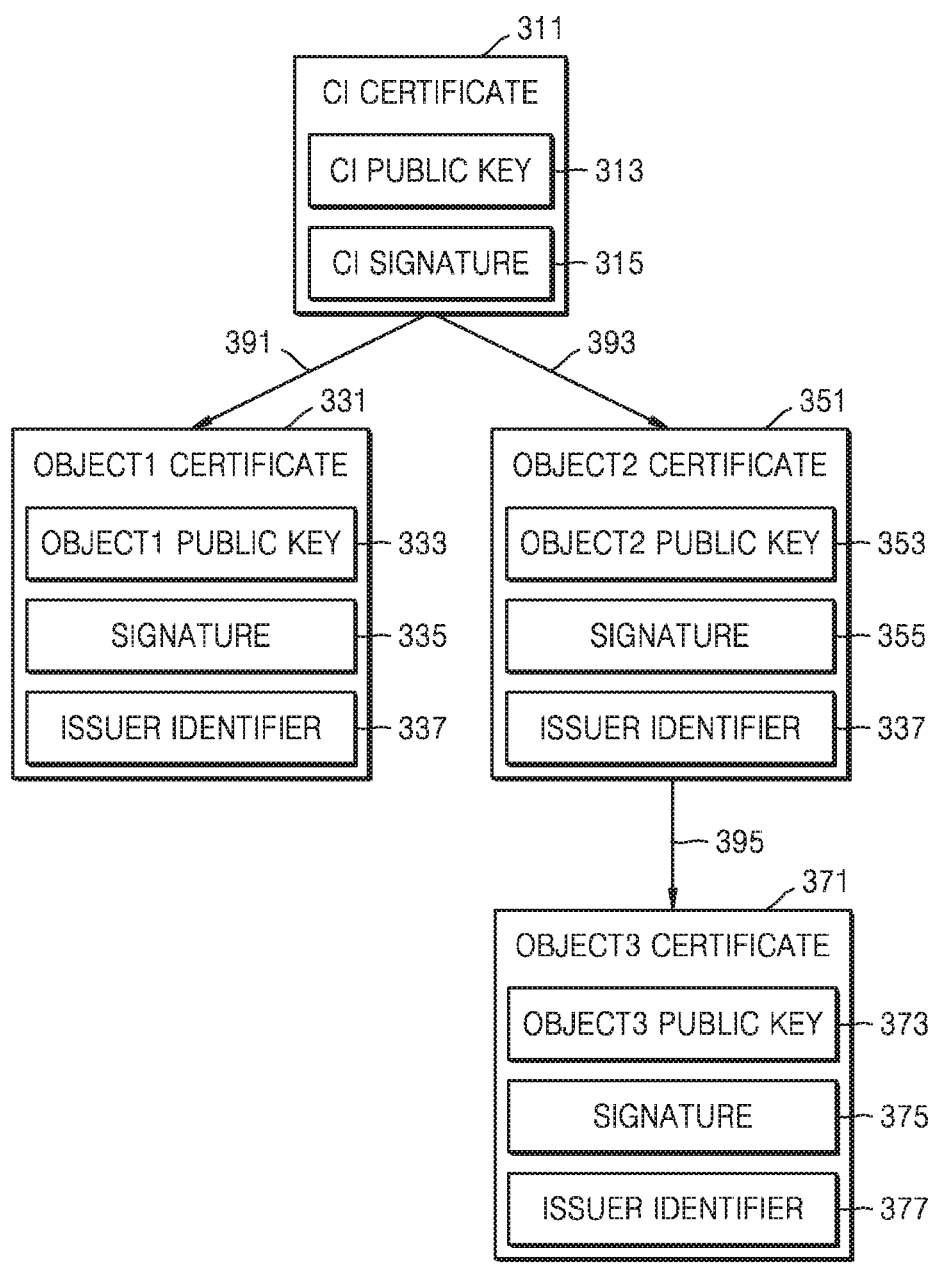
FIG. 3 is a schematic diagram illustrating an example of a certificate hierarchy (or a certificate chain) of certificates issued by a certificate issuer (CI), and an example of a public key (PK) and a CI digital signature included in each certificate, according to an embodiment of the disclosure.

FIG. 3 is a schematic diagram illustrating an example of a certificate hierarchy (or a certificate chain) of certificates issued by a CI, and an example of a PK and a CI digital signature included in each certificate, according to an embodiment of the disclosure.

Referring to FIG. 3, the CI may generate a CI PK 313 and a CI SK to be used by the CI, generate a CI certificate 311 including the CI PK 313, and attach, to the CI certificate 311, a digital signature generated using the CI SK, i.e., a CI signature 315.

Referring to FIG. 3, the CI certificate 311 may be used to issue (see reference numeral 391) an object1 certificate 331. Object1 may be, for example, an SPBM. Object1 may generate an object1 PK 333 and an object1 SK to be used by object1, generate the object1 certificate 331 including the object1 PK 333, and request and receive a CI digital signature 335 from the CI by using the CI SK. In this case, the object1 certificate 331 may include a CI identifier 337 corresponding to the CI PK 313 required to be used to verify the CI signature 335 included in the object1 certificate 331. The CI identifier 337 may include at least one of a CI PKID, a CI ID, a CI object ID, or an object universally unique identifier (UUID).

Referring to FIG. 3, the CI certificate 311 may be used to issue (see reference numeral 393) an object2 certificate 351. Object2 may be, for example, an SSP maker. Object2 may generate an object2 PK 353 and an object2 SK to be used by object2, generate the object2 certificate 351 including the object2 PK 353, and request and receive a CI digital signature 355 from the CI by using the CI SK. In this case, the object2 certificate 351 may include the CI identifier 337 corresponding to the CI PK 313 required to be used to verify the CI signature 355 included in the object2 certificate 351. The CI identifier 337 may include at least one of a CI PKID, a CI ID, a CI object ID, or an object UUID. The CI signatures 335 and 355 included in the object1 certificate 331 and the object2 certificate 351 may have different values, but the CI PKID 337 has the same value.

Referring to FIG. 3, the object2 certificate 351 may be used to issue (see reference numeral 395) an object3 certificate 371. Object3 may be, for example, an SSP produced by an SSP maker, or an SPBL included in the SSP. Object3 may generate an object3 PK 373 and an object3 SK to be used by object3, generate the object3 certificate 371 including the object3 PK 373, and request and receive an object3 digital signature 375 from object2 by using the object2 SK, i.e., the CI SK. In this case, the object3 certificate 371 may include an issuer identifier 377 corresponding to the object2 PK 353 required to be used to verify the object3 signature 375 included in the object3 certificate 371. The issuer identifier 377 may include at least one of an issuer PKID, an object ID, or an object UUID.

The object1 certificate 331, the object2 certificate 351, and the object3 certificate 371 illustrated in FIG. 3 may have the same CI certificate 311 as a root certificate or a root of certificate. Therefore, for mutual authentication, object1, object2, and object3 may require the CI certificate 311 or the CI PK 313 included therein. More specifically, in the example of FIG. 3, for mutual authentication between object1 and object2 using digital certificates and signatures, object1 may require the signature 355 of object2, the object2 certificate 351, and the CI PK 313, and object2 may require the signature 335 of object1, the object1 certificate 331, and the CI PK 313. In the example of FIG. 3, for mutual authentication between object1 and object3 using digital certificates and signatures, object1 may require the signature 375 of object3, the object3 certificate 371, the object2 certificate 351, and the CI PK 313, and object3 may require the signature 335 of object1, the object1 certificate 331, and the CI PK 313. In this case, with respect to the object3 certificate 371, the object2 certificate 351 may be called a sub CI or sub CA certificate.

Figure 4:
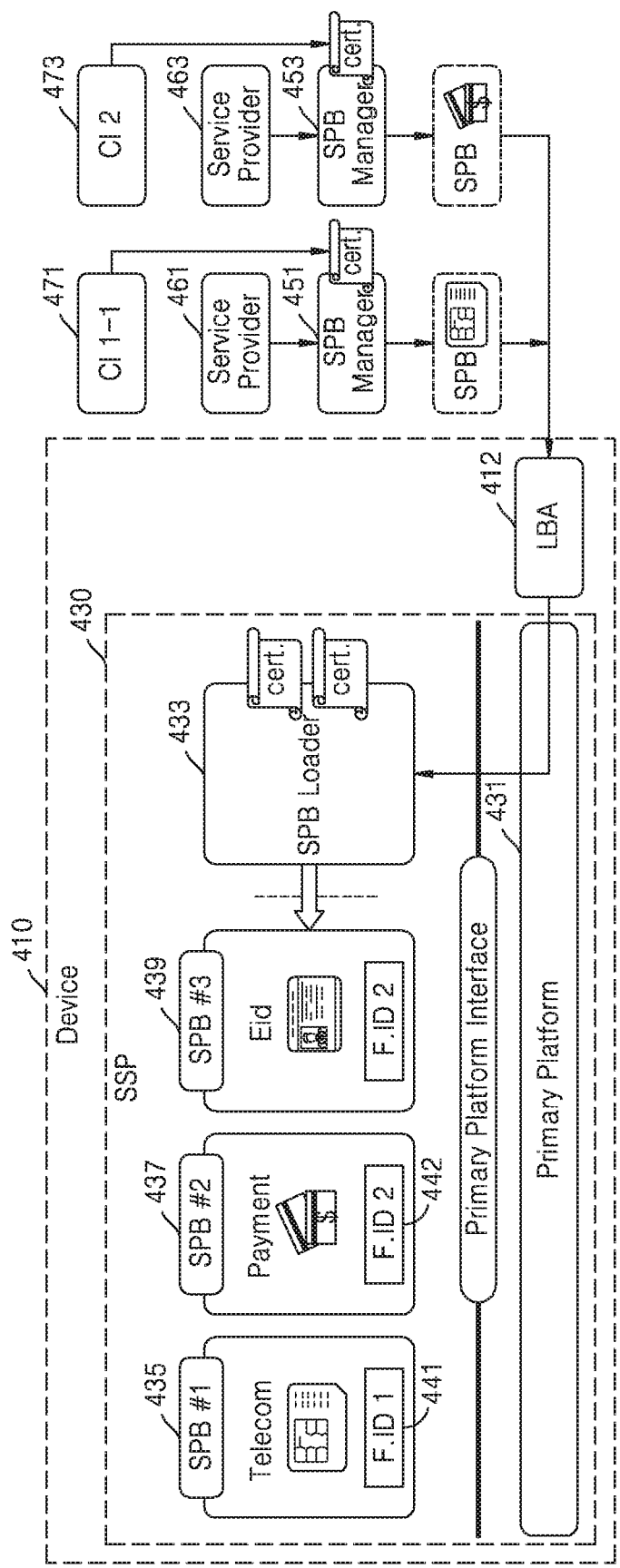
FIG. 4 is a schematic diagram illustrating an example of elements inside and outside a user equipment to download and install bundles in an SSP, according to an embodiment of the disclosure.

FIG. 4 is a schematic diagram illustrating an example of elements inside and outside a user equipment 410 to download and install bundles in an SSP 430, according to an embodiment of the disclosure.

In FIG. 4, the user equipment 410 may be a device including the SSP 430 and having an LBA 412 installed therein to control the SSP 430. The SSP 430 may be integrated into or removable from the user equipment 410. The SSP 430 may include a PP 431, an SPBL 433, and one or more SPBs 435, 437, and 439. The SPBs 435, 437, and 439 may not have been installed in the SSP 430 at a timing of release of the user equipment 410, but may be remotely downloaded and installed after release.

Referring to FIG. 4, the SPBs 435, 437, and 439 may have different bundle family IDs 441 and 442. The SSP 430 or the SPBL 433 may generate and manage certificate information to be used to download and install the SPBs 435, 437, and 439 for which the different bundle family IDs 441 and 442 are allocated. In this case, the certificate information separately managed based on the bundle family IDs 441 and 442 may be present on a certificate hierarchy of certificates issued by different CIs. When a bundle is downloaded and installed from a bundle management server 451 or 453, the SSP 430 or the SPBL 433 may select certificate information configured for the bundle family ID 441 or 442 allocated to the bundle, and transmit the information to the bundle management server 451 or 453. The certificate information 471, 473 may be a certificate or a PK of a CI in the certificate hierarchy, and be an identifier corresponding to the certificate and the PK (e.g., a CI ID, a CI object ID, an object UUID, or a CI PKID). The bundle management server 451 can receive a bundle from a service provider 461. The bundle management server 453 can receive a bundle from a service provider 463.

Figure 5:
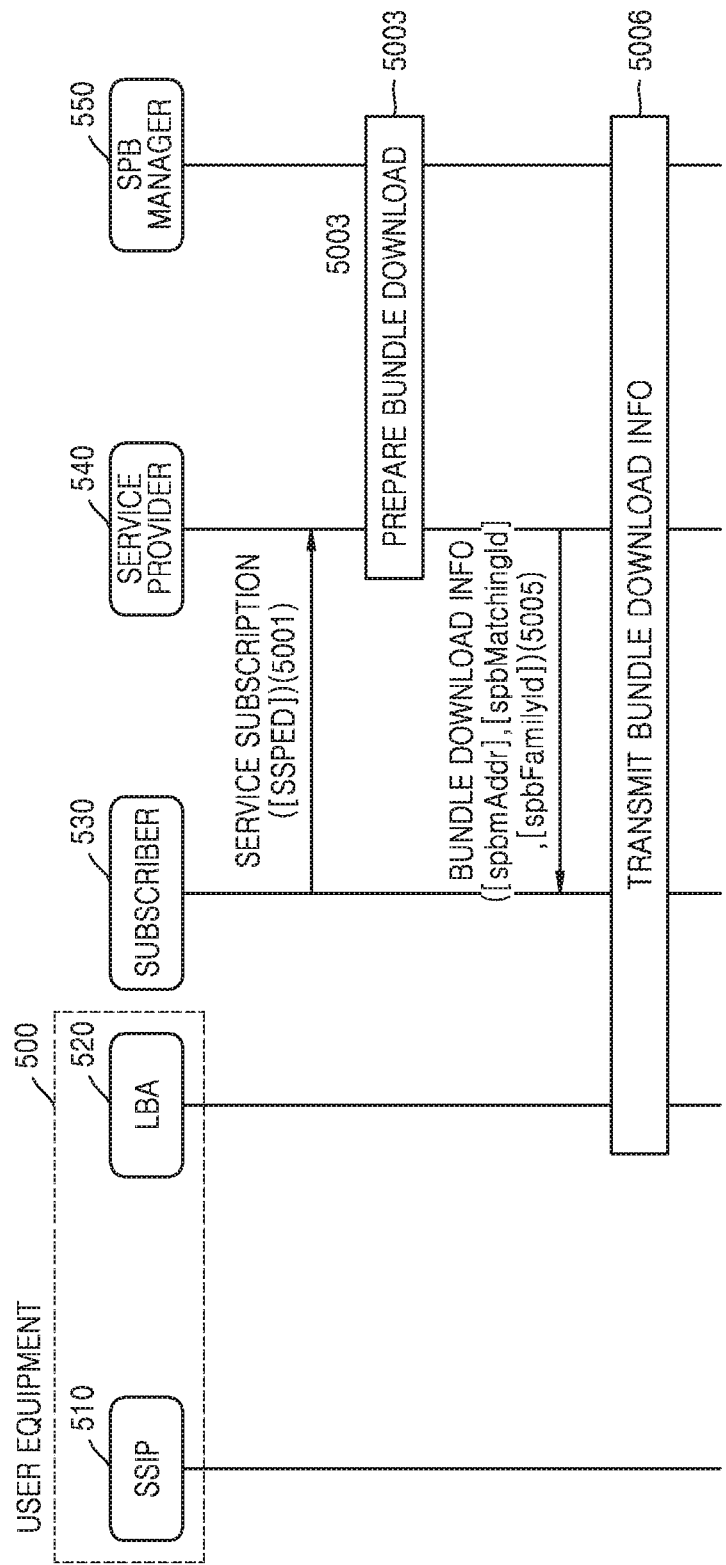
FIG. 5 is a schematic diagram illustrating an example of a general procedure in which a subscriber subscribes to a service via a service provider and prepares a bundle in a bundle management server, according to an embodiment of the disclosure.

FIG. 5 is a schematic diagram illustrating an example of a general procedure in which a subscriber 530 subscribes to a service via a service provider 540 and prepares a bundle in a bundle management server 550, according to an embodiment of the disclosure.

In FIG. 5, a user equipment 500 may be a device including an SSP 510 and having an LBA 520 installed therein to control the SSP 510. Although not shown in FIG. 5, a bundle requested by the service provider 540 may have been generated by and stored in the bundle management server 550, and the service provider 540 may have at least one of a bundle ID (or SPB ID) of the generated bundle, a bundle family ID (or SPB family ID) of the generated bundle, or an address (or SPBM address) of the bundle management server 550.

Referring to FIG. 5, in operation 5001, the subscriber 530 may select and subscribe to a service provided by the service provider 540 (e.g., a data service through a mobile communication network). In this case, to use the service provided by the service provider 540, the subscriber 530 may optionally transmit, to the service provider 540, an SSP ID of the SSP 510 of the user equipment 500 in which a bundle is to be installed. In operation 5003, the service provider 540 and the bundle management server 550 may perform a bundle download preparation procedure. In operation 5003, the service provider 540 may optionally transmit, to the bundle management server 550, the SSP ID of the SSP 510 in which a bundle is to be installed, and transmit, to the bundle management server 550, at least one of a bundle ID (or SPB ID) or a bundle family ID (or SPB family ID) of a specific bundle capable of providing the service selected by the subscriber 530 from among bundles prepared in the bundle management server 550. In operation 5003, the bundle management server 550 may select a bundle having the received bundle ID or one of bundles having the received bundle family ID, and transmit an identifier of the selected bundle to the service provider 540. The service provider 540 or the bundle management server 550 may newly generate a bundle matching ID capable of identifying the selected bundle. The bundle management server 550 may connect and manage the received SSP ID and the selected bundle. In operation 5003, the bundle management server 550 may transmit an SPBM address from which the selected bundle may be downloaded and, in this case, the SPBM address may be an address of the bundle management server 550 or another bundle management server in which the prepared bundle is stored, or an address of another bundle management server capable of storing and obtaining download information (e.g., a server address) of the prepared bundle.

Referring to FIG. 5, in operation 5005, the service provider 540 may transmit prepared bundle download information to the subscriber 530. The bundle download information may optionally transmit at least one of the SPBM address at which the bundle is prepared, the bundle matching ID of the prepared bundle, or the bundle family ID (or SPB family ID) of the prepared bundle.

Referring to FIG. 5, in operation 5006, the bundle download information may be transmitted to the LBA 520. The bundle download information may be at least one of the SPBM address to be accessed by the LBA 520, a bundle identifier of the bundle prepared in operation 5003, or a bundle family ID (or SPB family ID) of the prepared bundle. The bundle identifier may include at least one of the bundle matching ID generated in operation 5003, or a bundle event ID. The bundle identifier may include the bundle family ID of the prepared bundle. The bundle event ID may include at least one of the bundle matching ID of the bundle prepared in operation 5003, or the SPBM address. The bundle download information may be input (e.g., as a scanned QR code or a direct text input) by the subscriber 530 to the LBA 520. The bundle download information may be input by the subscriber 530 or the service provider 540 via an information providing server (not shown) to the LBA 520 by using a push input. The LBA 520 may receive the bundle download information by accessing an information providing server (not shown) previously configured for the user equipment 500.

Figure 6:
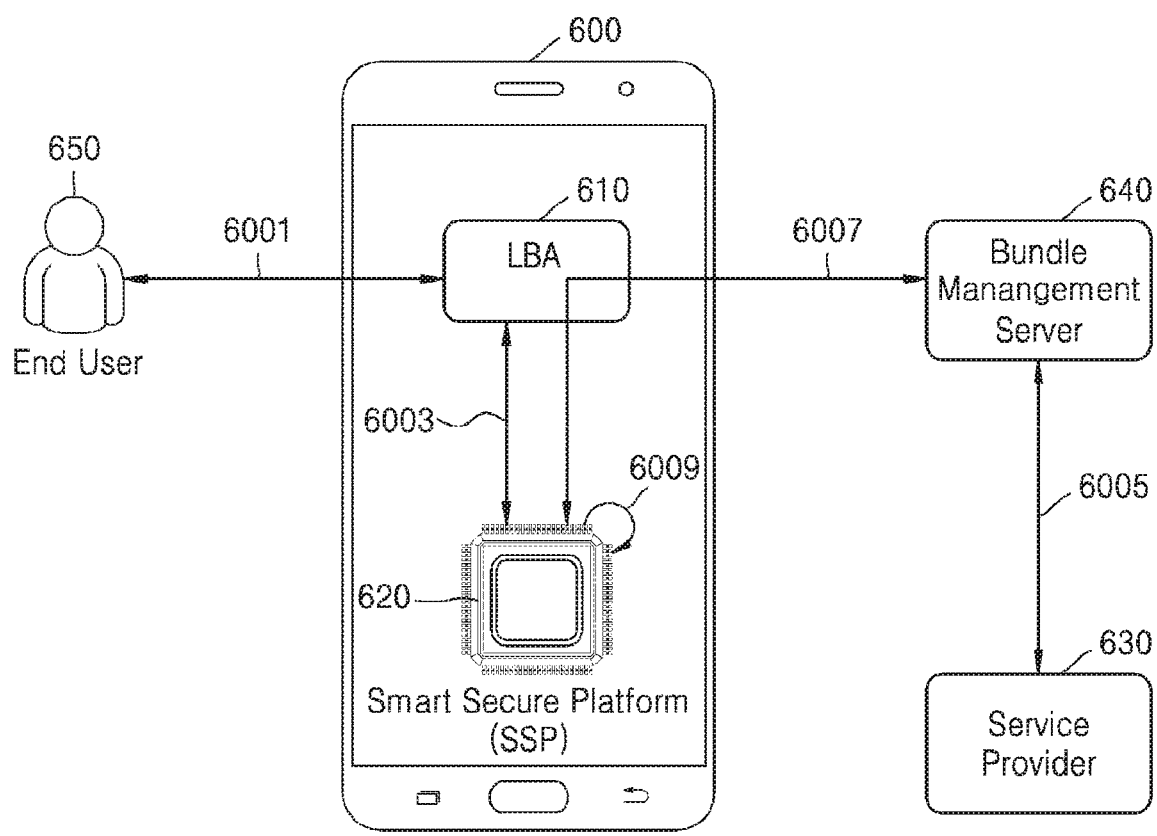
FIG. 6 is a schematic diagram illustrating the configuration of a user equipment and an example of a cooperation method between a service provider, a bundle management server, and an end user, according to an embodiment of the disclosure.

FIG. 6 is a schematic diagram illustrating the configuration of a user equipment 600 and an example of a cooperation method between a service provider 630, a bundle management server 640, and an end user 650, according to an embodiment of the disclosure.

Referring to FIG. 6, the user equipment 600 may include at least one LBA 610 and at least one SSP 620.

As in operations 6001 and 6003, the end user 650 may give a command to the SSP 620 via the LBA 610 in the user equipment 600. Alternatively, the LBA 610 may directly give a command to the SSP 620 without an input of the end user 650 based on operation 6003. As used herein, the above-described bundle management operation 6001 or 6003 by the end user 650 or the user equipment 600 may be called local management.

In operation 6005, the service provider 630 may request the bundle management server 640 to remotely manage a bundle. In operation 6007, the bundle management server 640 may give a remote management command via the LBA 610 to the SSP 620. As used herein, the above-described bundle management operation 6005 or 6007 by the service provider 630 may be called remote management.

In operation 6009, the SSP 620 may check bundle policies to process the received local or remote management command. The LBA 610 or the bundle management server 640 may also check the bundle policies. The method of checking the bundle policies will be described in detail below.

Figure 7:
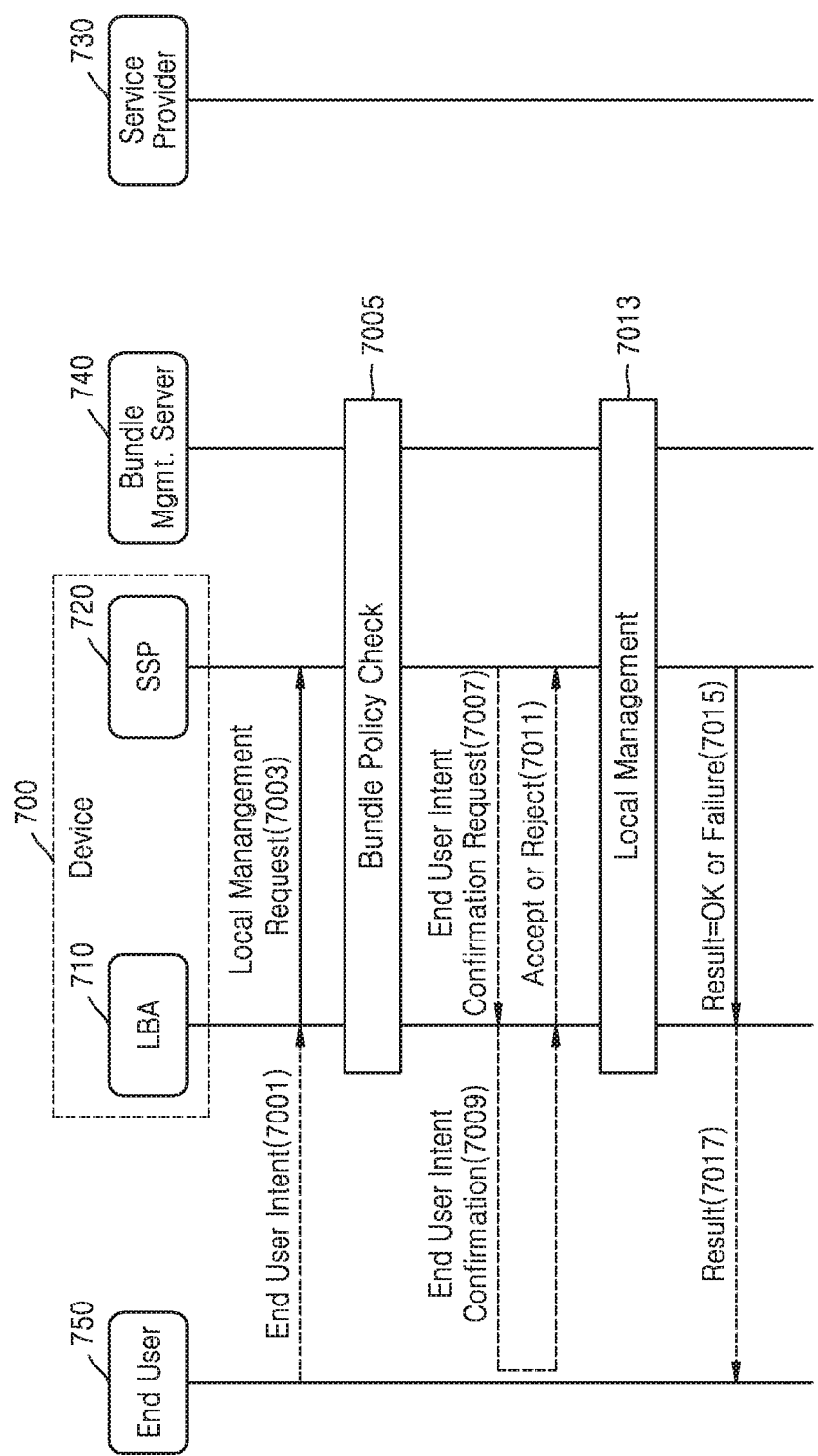
FIG. 7 is a schematic diagram illustrating an example of a general procedure in which a user equipment performs bundle local management, according to an embodiment of the disclosure.

FIG. 7 is a schematic diagram illustrating an example of a general procedure in which a user equipment 700 performs bundle local management, according to an embodiment of the disclosure.

In FIG. 7, descriptions of the user equipment 700, an LBA 710, an SSP 720, a service provider 730, a bundle management server 740, and an end user 750, which are provided above in relation to FIGS. 1 to 6, will not be repeated herein.

Referring to FIG. 7, in operation 7001, the end user 750 may express, to the LBA 710, an end user intent to start specific local management. Operation 7001 may use a general user interface used for interaction between an end user and a user equipment. For example, the end user 750 may input specific data (e.g., a scanned QR code) to the LBA 710 or select a specific menu of the LBA 710. When the user equipment 700 performs a local management operation not requiring the end user intent based on bundle policies, operation 7001 may be omitted.

In operation 7003, the LBA 710 may transmit a local management request to the SSP 720. When a local management operation requiring the end user intent based on the bundle policies is performed, operation 7003 may reflect the end user intent of operation 7001. When a local management operation not requiring the end user intent based on the bundle policies is performed, the LBA 710 may directly perform operation 7003 without performing operation 7001.

In operation 7005, the SSP 720 may check bundle policies of a target bundle to perform local management. In operation 7005, the LBA 710 and/or the bundle management server 740 may also check the bundle policies. For example, for a local management operation for installing a bundle, the SSP 720 may receive, via the LBA 710 from the bundle management server 740, bundle metadata and/or a part of bundle policies of a bundle to be installed. As another example, in addition to bundle policies stored in the SSP 720, the SSP 720 may receive the entirety or a part of the bundle policies from the LBA 710. The operation of checking the bundle policies by the SSP 720 will be described in detail below. When the LBA 710 autonomously performs local management without the end user intent, and when the result of checking the bundle policies indicates that the local management requires the end user intent, the SSP 720 may terminate the local management by performing operation 7015. When local management is performed on a bundle for which local management is not allowed based on the bundle policies, the SSP 720 may terminate the local management by performing operation 7015.

When the result of checking the bundle policies indicates that an end user intent confirmation is further required for the local management, in operation 7007, the SSP 720 may transmit an end user intent confirmation request to the LBA 710. In operation 7009, the LBA 710 may check the end user intent confirmation of the end user 750. Operation 7009 may be performed, for example, by outputting a screen for simply selecting "Yes/No", by receiving a personal identification number (PIN) (or PIN code) preset by the end user 750 or the service provider 730, by receiving biometric information (e.g., fingerprint or iris information) of the end user 750, or by using various other means provided by the user equipment 700. The means used to check the end user intent confirmation in operation 7009 may be configured in the bundle policies. In operation 7011, the LBA 710 may transmit, to the SSP 720, the result of checking the end user intent confirmation (e.g., accept or reject). When the end user intent confirmation is not required for the local management based on the bundle policies, operations 7007 to 7011 may be omitted. When the result of checking the end user intent confirmation indicates that the end user 750 rejects the local management or does not respond within a certain time, the SSP 720 may terminate the local management by performing operation 7015. When the end user intent confirmation is not required or the result of checking the end user intent confirmation indicates that the end user 750 accepts the local management, the SSP 720 may perform operation 7013.

In operation 7013, the SSP 720 may perform the local management. Operation 7013 may also be performed by the LBA 710 and/or the bundle management server 740. For example, for a local management operation for installing a bundle, the SSP 720 may receive and install a bundle via the LBA 710 from the bundle management server 740.

In operation 7015, the SSP 720 may notify the LBA 710 of the result of performing the local management (e.g., success or failure).

In operation 7017, the LBA 710 may notify the end user 750 of the result of performing the local management (e.g., success or failure). When the result of performing the local management is not required to be notified to the end user 750, operation 7017 may be omitted.

Referring to FIG. 7, when the bundle local management is performed, the user equipment 700 may determine whether the end user intent and the end user intent confirmation are required based on the bundle policies, and accept/execute or reject a local management command based on the determination result.

Figure 8:
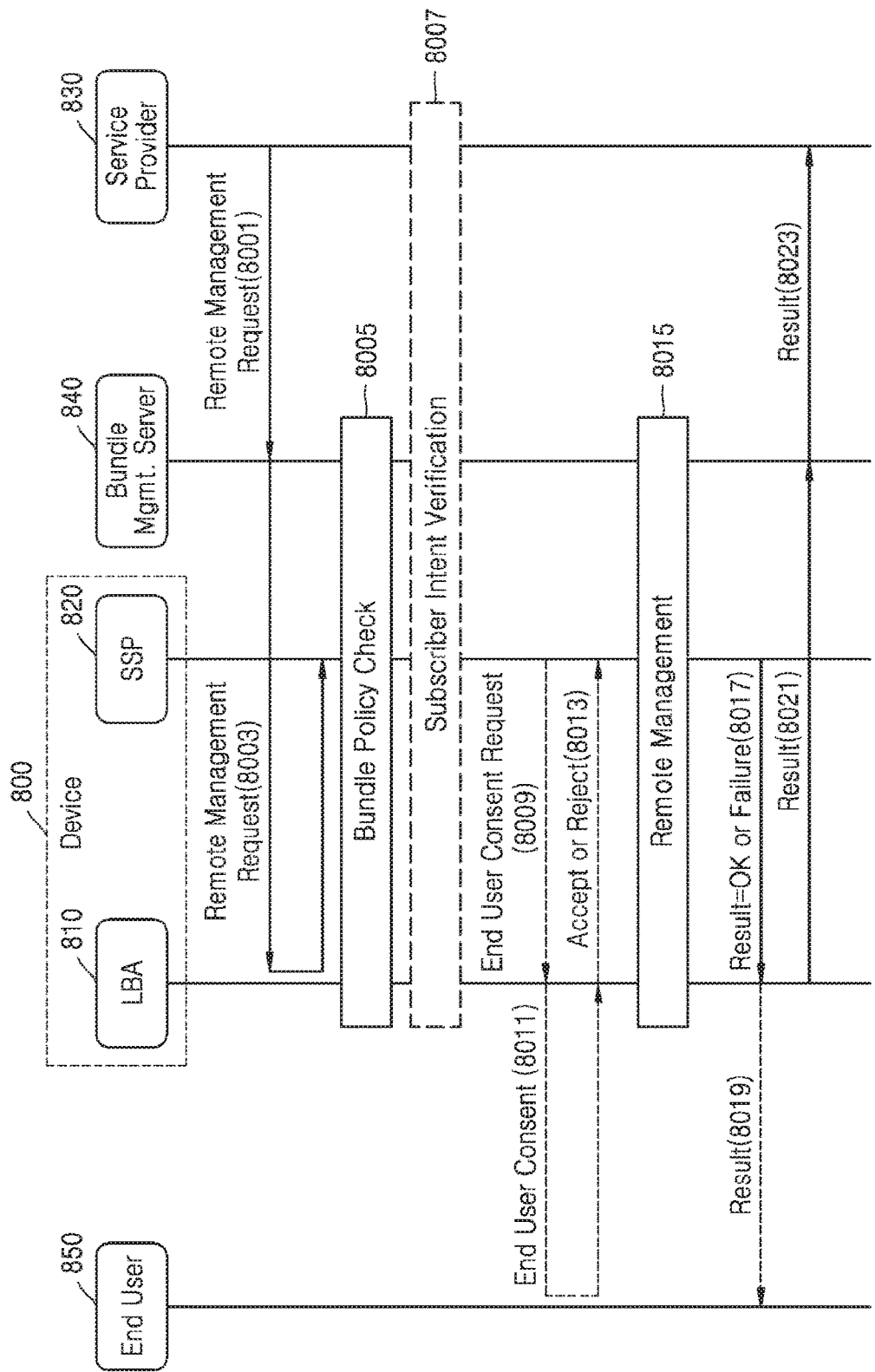
FIG. 8 is a schematic diagram illustrating an example of a general procedure in which a user equipment performs bundle remote management, according to an embodiment of the disclosure.

FIG. 8 is a schematic diagram illustrating an example of a general procedure in which a user equipment 800 performs bundle remote management, according to an embodiment of the disclosure.

In FIG. 8, descriptions of the user equipment 800, an LBA 810, an SSP 820, a service provider 830, a bundle management server 840, and an end user 850, which are provided above in relation to FIGS. 1 to 6, will not be repeated herein.

Referring to FIG. 8, in operation 8001, the service provider 830 may transmit a bundle remote management request to the bundle management server 840.

In operation 8003, the bundle management server 840 may transmit a specific bundle remote management request via the LBA 810 to the SSP 820. The bundle remote management request may further include a bundle remote management command and the entirety or a part of information required to perform bundle remote management (e.g., an ID or a family ID of a target bundle to be remotely managed, and a remote management command type such as enable/disable/delete). The bundle remote management command and the entirety or the part of the information required to perform bundle remote management may be transmitted in operation 8003 or in operation 8015.

In operation 8005, the SSP 820 may check bundle policies of the target bundle to perform remote management. In operation 8005, the LBA 810 and/or the bundle management server 840 may also check the bundle policies. For example, for a remote management operation for installing a bundle, the SSP 820 may receive, via the LBA 810 from the bundle management server 840, bundle metadata and/or a part of bundle policies of a bundle to be installed. As another example, in addition to bundle policies stored in the SSP 820, the SSP 820 may receive the entirety or a part of the bundle policies from the LBA 810 or the bundle management server 840. The operation of checking the bundle policies by the SSP 820 will be described in detail below. When remote management is performed on a bundle for which remote management is not allowed based on the bundle policies, the SSP 820 may terminate the remote management by performing operation 8017.

When the result of checking the bundle policies indicates that a subscriber intent verification is required for the remote management, in operation 8007, the SSP 820 may verify a subscriber intent. Operation 8007 may also be performed by the user equipment 800, the service provider 830, and/or the bundle management server 840. Operation 8007 may be performed, for example, by verifying a digital signature and certificate of the service provider 830 for arbitrary data (e.g., the remote management request message of operation 8001 or an arbitrary character string generated by the bundle management server 840 or the SSP 820), by verifying a credential key previously provided from the service provider 830 to a bundle installed in the bundle management server 840, the LBA 810, the SSP 820, and/or the user equipment 800, or by using various other means provided by the user equipment 800, the bundle management server 840, and the service provider 830. The means used to verify the subscriber intent in operation 8007 may be configured in the bundle policies or, when not configured in the bundle policies, an arbitrary means accepted/selected by the user equipment 800, the bundle management server 840, or the service provider 830 may be used. When the result of checking the bundle policies indicates that the subscriber intent verification is not required for the remote management, operation 8007 may be omitted. When the subscriber intent verification fails, the SSP 820 may terminate the remote management by performing operation 8017. When the subscriber intent verification is not required or the subscriber intent verification succeeds, the SSP 820 may perform operation 8009. Although operation 8007 is performed before operation 8009 or 8013 in FIG. 8, it should be noted that operation 8007 may be performed after operation 8009 or 8013 based on implementation. Operation 8007 may be performed integrally with operation 8003, 8005, or 8015. For example, when a digital signature of the service provider 830 needs to be verified to verify the subscriber intent in operation 8007, operation 8007 may be substituted by the checking of the bundle policies in operation 8005, the transmitting of the bundle remote management request in operation 8003, or checking of a digital signature generated for the bundle remote management command by the service provider 830 in operation 8015.

When the result of checking the bundle policies indicates that an end user consent is further required for the remote management, in operation 8009, the SSP 820 may transmit an end user consent request to the LBA 810. In operation 8011, the LBA 810 may check the end user consent of the end user 850. Operation 8011 may be performed, for example, by outputting a screen for simply selecting "Yes/No", by receiving a PIN (or PIN code) preset by the end user 850 or the service provider 830, by receiving biometric information (e.g., fingerprint or iris information) of the end user 850, or by using various other means provided by the user equipment 800. The means used to check the end user consent in operation 8011 may be configured in the bundle policies or, when not configured in the bundle policies, an arbitrary means accepted/selected by the user equipment 800, the bundle management server 840, or the service provider 830 may be used. In operation 8013, the LBA 810 may transmit, to the SSP 820, the result of checking the end user consent (e.g., accept or reject). When the end user consent is not required for the remote management based on the bundle policies, operations 8009 to 8013 may be omitted. When the result of checking the end user consent indicates that the end user 850 rejects the remote management or does not respond within a certain time, the SSP 820 may terminate the remote management by performing operation 8017. When the end user consent is not required or the result of checking the end user consent indicates that the end user 850 accepts the remote management, the SSP 820 may perform operation 8015.

In operation 8015, the SSP 820 may perform the remote management. Operation 8015 may also be performed by the LBA 810 and/or the bundle management server 840. For example, for a remote management operation for installing a bundle, the SSP 820 may receive and install a bundle via the LBA 810 from the bundle management server 840.

In operation 8017, the SSP 820 may notify the LBA 810 of the result of performing the remote management (e.g., success or failure).

In operation 8019, the LBA 810 may notify the end user 850 of the result of performing the remote management (e.g., success or failure). When the result of performing the remote management is not required to be notified to the end user 850, operation 8019 may be omitted.

In operation 8021, the LBA 810 may notify the bundle management server 840 of the result of performing the remote management (e.g., success or failure).

In operation 8023, the bundle management server 840 may notify the service provider 830 of the result of performing the remote management (e.g., success or failure).

Referring to FIG. 8, when the bundle remote management is performed, the user equipment 800 may determine whether the subscriber intent verification and the end user consent are required based on the bundle policies, and accept/execute or reject a remote management command based on the determination result.

FIG. 9 is a schematic diagram illustrating an example of configuring bundle policies 910, according to an embodiment of the disclosure.

Referring to FIG. 9, the bundle policies 910 may be represented by a series of parameters. Although the bundle policies 910 are expressed in the form of a table in FIG. 9 for convenience of explanation, the bundle policies 910 are not limited to the table and may be configured as a list of parameters. It should be noted that values of the parameters shown in FIG. 9 merely represent an example of the bundle policies for convenience of explanation and may be vary for different bundles.

The bundle policies 910 may include a bundle identifier 911 for identifying each bundle. The bundle identifier 911 may be a character string or a numeric string indicating the name or a bundle ID of each bundle. Although not shown in FIG. 9, the bundle identifier 911 may further include a family ID (or FID) of each bundle.

The bundle policies 910 may include a "Visible to End User" indicator 913 indicating whether each bundle is allowed to be displayed to an end user. When a bundle is allowed to be displayed to the end user, a screen (not shown) of an LBA may display the bundle to the end user, and the "Visible to End User" indicator 913 may be represented by a character string, a numeric string, and/or a Boolean value indicating "Yes". When the bundle is not allowed to be displayed to the end user, the screen (not shown) of the LBA may not display the bundle to the end user, and the "Visible to End User" indicator 913 may be represented by a character string, a numeric string, and/or a Boolean value indicating "No".

The bundle policies 910 may include a "Command" type 915 including a list of types of a local or remote management command to be received by each bundle. Each remote management command may be represented by a character string or a numeric string indicating the command. Although the local or remote management command has five types such as "install", "enable", "disable", "delete", and "update" in FIG. 9, the "Command" type 915 of the local or remote management command is not limited thereto and may be extended to various other bundle management command types. Although each local or remote management command is separately specified in FIG. 9, one or more local or remote management commands may be grouped and specified together. For example, commands may be categorized into two types such as "install" and "Etc. (or Others)" to separately express commands corresponding to bundle installation and the other commands, or all commands may be categorized into one type such as "All".

The bundle policies 910 may include a "Local Management" configuration 917 indicating detailed local management configurations of each command based on the command type 915.

More specifically, the "Local Management" configuration 917 may further include an "Allowed" indicator 917a indicating whether each local management command is allowed. When a local management command of a bundle is allowed, the "Allowed" indicator 917a may be represented by a character string, a numeric string, or a Boolean value indicating "Yes". When the local management command of the bundle is not allowed, the "Allowed" indicator 917a may be represented by a character string, a numeric string, or a Boolean value indicating "No".

The "Local Management" configuration 917 may further include an "End User Intent" indicator 917b indicating whether an end user intent is required to execute each local management command. When the local management command of the bundle is required to be started by an end user, the "End User Intent" indicator 917b may be represented by a character string, a numeric string, and/or a Boolean value indicating "Required". When the local management command of the bundle is not required to be started by the end user, and the user equipment can autonomously start it, the "End User Intent" indicator 917b may be represented by a character string, a numeric string, and/or a Boolean value indicating "Not Required". When the "Allowed" indicator 917a indicates that the local management command of the bundle is not allowed, the "End User Intent" indicator 917b may be represented by a character string, a numeric string, or a Boolean value indicating "Not Applicable (N/A)".

The "Local Management" configuration 917 may further include an "End User Intent Confirmation" indicator 917c indicating whether an end user intent confirmation is required to execute each local management command. When the end user intent confirmation is required to execute the local management command of the bundle, the "End User Intent Confirmation" indicator 917c may be represented by a character string, a numeric string, and/or a Boolean value indicating "Required", and a means for the end user intent confirmation may be further configured as necessary. For example, a screen for selecting "Yes/No" may be output to the end user (see "Yes or No" of reference numeral 917c), biometric information (e.g., fingerprint/iris information) of the end user may be received (see "Fingerprint" of reference numeral 917c), a PIN designated by the end user may be received (see "PIN" of reference numeral 917c), or various other checking means may be used. Although the end user intent confirmation is indicated as being "Required", when the means for the end user intent confirmation is not specified or the specified means for the end user intent confirmation is not usable by a user equipment, the user equipment may arbitrarily select one of usable checking means. When the end user intent confirmation is not required to execute the local management command of the bundle, the "End User Intent Confirmation" indicator 917c may be represented by a character string, a numeric string, and/or a Boolean value indicating "Not Required". When the "Allowed" indicator 917a indicates that the local management command of the bundle is not allowed, the "End User Intent Confirmation" indicator 917c may be represented by a character string, a numeric string, or a Boolean value indicating "N/A".

The bundle policies 910 may include a "Remote Management" configuration 919 indicating detailed remote management configurations of each command based on the command type 915.

More specifically, the "Remote Management" configuration 919 may further include an "Allowed" indicator 919a indicating whether each remote management command is allowed. When a remote management command of a bundle is allowed, the "Allowed" indicator 919a may be represented by a character string, a numeric string, or a Boolean value indicating "Yes". When the remote management command of the bundle is not allowed, the "Allowed" indicator 919a may be represented by a character string, a numeric string, or a Boolean value indicating "No".

The "Remote Management" configuration 919 may further include an "End User Consent" indicator 919b indicating whether an end user consent is required to execute each remote management command. When the remote management command of the bundle requires the end user consent, the "End User Consent" indicator 919b may be represented by a character string, a numeric string, and/or a Boolean value indicating "Required", and a means for the end user consent may be further configured as necessary. For example, similarly to the example of the "End User Intent Confirmation" indicator 917c, a screen for selecting "Accept/Reject" may be output to the end user (see "Accept or Reject" of reference numeral 919b), biometric information (e.g., fingerprint/iris information) of the end user may be received (see "Fingerprint" of reference numeral 919b), a PIN designated by the end user may be received (see "PIN" of reference numeral 919b), or various other checking means may be used. Although the end user consent is indicated as being "Required", when the means for the end user consent is not specified or the specified means for the end user consent is not usable by a user equipment, the user equipment may arbitrarily select one of usable checking means. When the remote management command of the bundle does not require the end user consent, the "End User Consent" indicator 919b may be represented by a character string, a numeric string, and/or a Boolean value indicating "Not Required". When the "Allowed" indicator 919a indicates that the remote management command of the bundle is not allowed, the "End User Consent" indicator 919b may be represented by a character string, a numeric string, or a Boolean value indicating "N/A".

The "Remote Management" configuration 919 may further include a "Subscriber Intent Verification" indicator 919c indicating whether a subscriber intent verification is required to execute each remote management command. When the subscriber intent verification is required to execute the remote management command of the bundle, the "Subscriber Intent Verification" indicator 919c may be represented by a character string, a numeric string, and/or a Boolean value indicating "Required", and a means for the subscriber intent verification may be further configured as necessary. For example, security information such as a credential key of a subscriber may be checked (see "Credential Key" of reference numeral 919c), a digital signature using a digital certificate of the subscriber may be checked (see "Signed Token" of reference numeral 919c), or various other verification means may be used. Although the subscriber intent verification is indicated as being "Required", when the means for the subscriber intent verification is not specified or the specified means for the subscriber intent verification is not usable by a user equipment and/or a bundle management server, the device and/or the bundle management server may arbitrarily select one of usable verification means. When the subscriber intent verification is not required to execute the remote management command of the bundle, the "Subscriber Intent Verification" indicator 919c may be represented by a character string, a numeric string, and/or a Boolean value indicating "Not Required". When the "Allowed" indicator 919a indicates that the remote management command of the bundle is not allowed, the "Subscriber Intent Verification" indicator 919c may be represented by a character string, a numeric string, or a Boolean value indicating "Not Applicable (N/A)".

Figure 10:
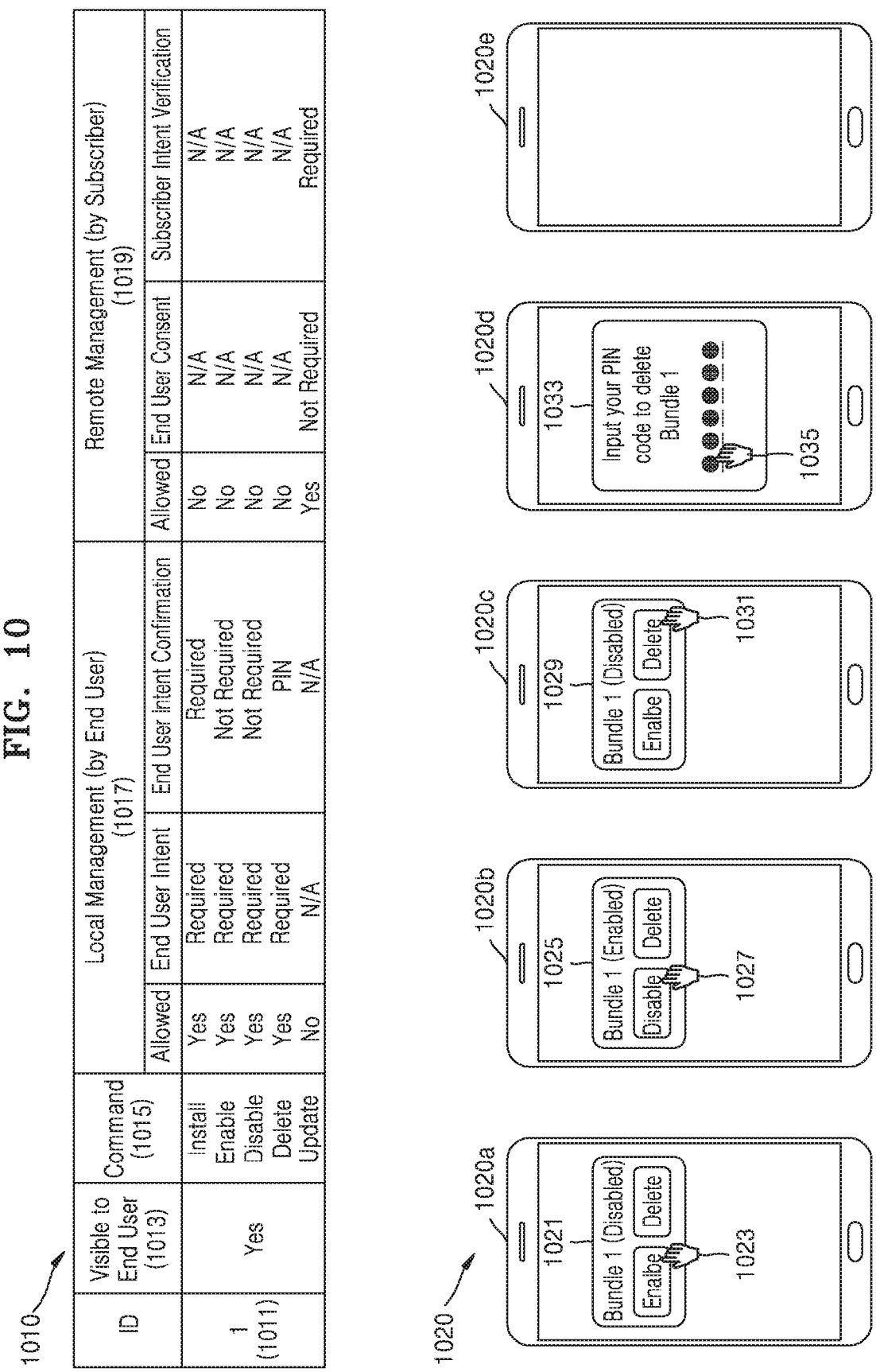
FIG. 10 is a schematic diagram illustrating an example of a procedure in which a user equipment performs bundle local management, according to an embodiment of the disclosure.

FIG. 10 is a schematic diagram illustrating an example of a procedure in which a user equipment 1020 performs bundle local management, according to an embodiment of the disclosure.

Referring to FIG. 10, the user equipment 1020 may have a first bundle 1011 installed therein. The current embodiment of the disclosure assumes that the first bundle 1011 is currently disabled. The first bundle 1011 may further include bundle policies 1010. The entirety or a part of the bundle policies 1010 may be included not only in a bundle but also in the user equipment 1020, an LBA (not shown), and/or a bundle management server (not shown).

Because the first bundle 1011 is configured to be displayed to an end user (see reference numeral 1013), in operation 1021, the first bundle 1011 may be displayed on an LBA configuration screen 1020a of the user equipment 1020. In operation 1023, the end user may attempt to locally enable the first bundle 1011 using a command 1015.

Because a local management configuration 1017 of the first bundle 1011 does not require an end user intent confirmation for an enable operation, in operation 1025, the first bundle 1011 may be displayed as being enabled on an LBA configuration screen 1020b of the user equipment 1020 without an additional input of the end user after operation 1023. In operation 1027, the end user may attempt to locally disable the first bundle 1011.

Because the local management configuration 1017 of the first bundle 1011 does not require an end user intent confirmation for a disable operation, in operation 1029, the first bundle 1011 may be displayed as being disabled on an LBA configuration screen 1020c of the user equipment 1020 without an additional input of the end user after operation 1025. In operation 1031, the end user may attempt to locally delete the first bundle 1011.

Because the local management configuration 1017 of the first bundle 1011 requires an end user intent confirmation such as a PIN input for a delete operation, in operation 1033, an LBA configuration screen 1020d of the user equipment 1020 may request the end user to input a PIN. In operation 1035, the end user may input a PIN. The operation of requesting the PIN of the end user in operation 1035 may be substituted by an operation of requesting biometric information (e.g., fingerprint/iris information) or a selection (e.g., "Yes/No") of the end user, based on the configuration of the bundle policies 1010.

When the PIN input by the end user in operation 1035 is valid, the user equipment 1020 may delete the first bundle 1011. When no more bundle is left in the user equipment 1020, an LBA configuration screen 1020e of the user equipment 1020 may display no bundle. Although a local management configuration 1017 is described herein, a remote management configuration 1019 by a subscriber is also possible.

Figure 11:
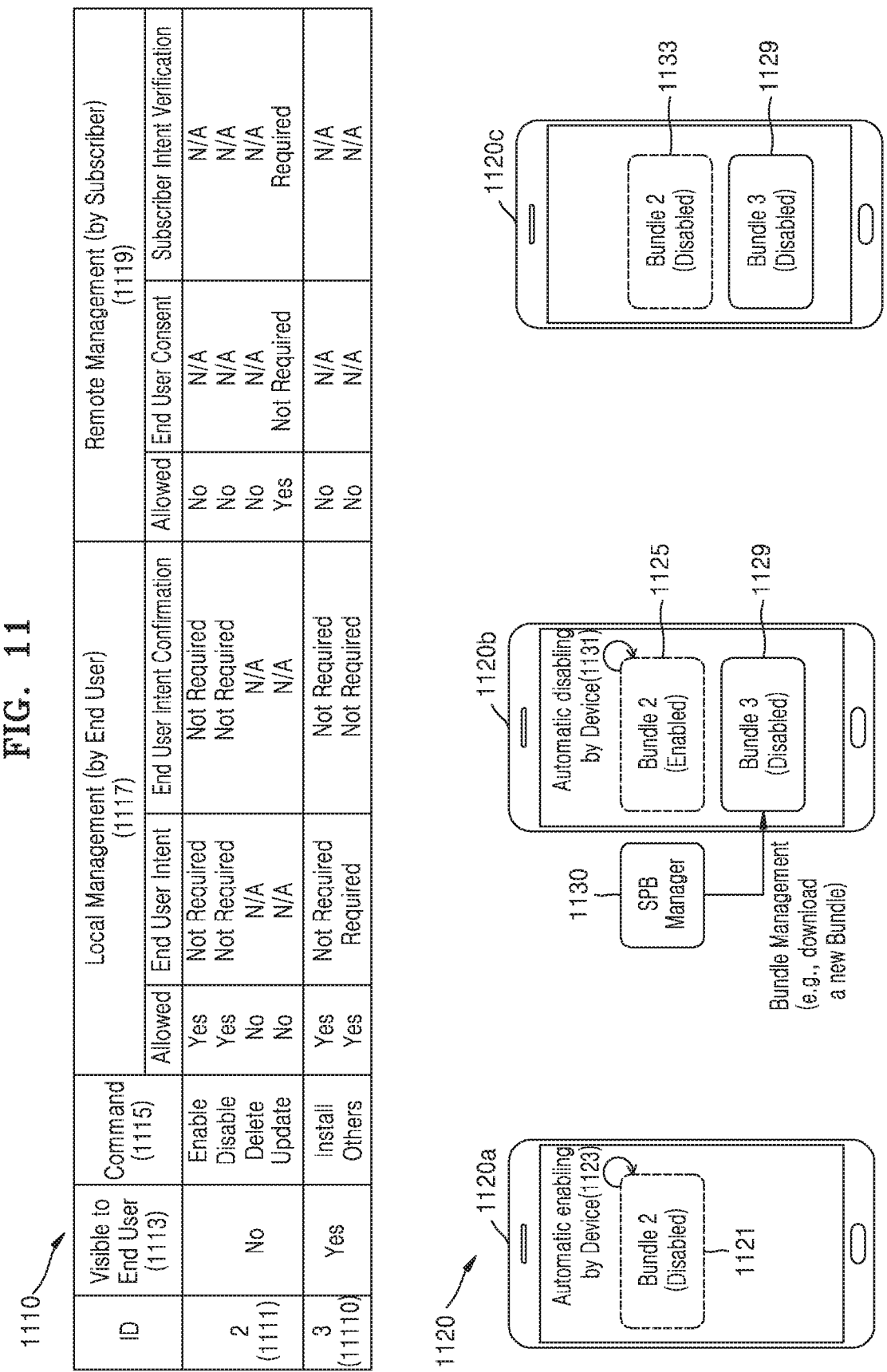
FIG. 11 is a schematic diagram illustrating another example of a procedure in which a user equipment performs bundle local management, according to an embodiment of the disclosure.

FIG. 11 is a schematic diagram illustrating another example of a procedure in which a user equipment 1120 performs bundle local management, according to an embodiment of the disclosure.

Referring to FIG. 11, the user equipment 1120 may have installed therein a second bundle 1111 for providing a communication service. The current embodiment of the disclosure assumes that the second bundle 1111 is currently disabled. The second bundle 1111 may further include bundle policies 1110. The entirety or a part of the bundle policies 1110 may be included not only in a bundle but also in the user equipment 1120, an LBA (not shown), and/or a bundle management server 1130.

Because the second bundle 1111 is configured not to be displayed to an end user (see reference numeral 1113), in operation 1121, the second bundle 1111 may be hidden on an LBA configuration screen 1120a of the user equipment 1120. Because a local management configuration 1117 of the second bundle 1111 allows the user equipment 1120 to locally enable or disable the second bundle 1111 without an end user intent, in operation 1123, the user equipment 1120 may locally enable the second bundle 1111 without any input of the end user using a command 1115.

Because the local management configuration 1117 of the second bundle 1111 does not require an end user intent confirmation for an enable operation, in operation 1125, the second bundle 1111 may be enabled in a hidden state on an LBA configuration screen 1120b of the user equipment 1120 without an additional input of the end user after operation 1123. In operation 1127, the user equipment 1120 may receive and install a third bundle 11110 from the bundle management server 1130 by using the communication service provided by the second bundle 1111. Because the local management configuration 1117 of the third bundle 11110 does not require an end user intent confirmation for a bundle install operation, in operation 1129, the installed third bundle 11110 may be displayed on an LBA configuration screen 1120b of the user equipment 1120 without an additional input of the end user after operation 1127. In operation 1131, the user equipment 1120 may locally disable the second bundle 1111.

Because the local management configuration 1117 of the second bundle 1111 does not require an end user intent confirmation for a disable operation, in operation 1133, the second bundle 1111 may be disabled in a hidden state on an LBA configuration screen 1120c of the user equipment 1120 without an additional input of the end user after operation 1131. Although a local management configuration 1117 is described herein, a remote management configuration 1119 by a subscriber is also possible.

Figure 12:
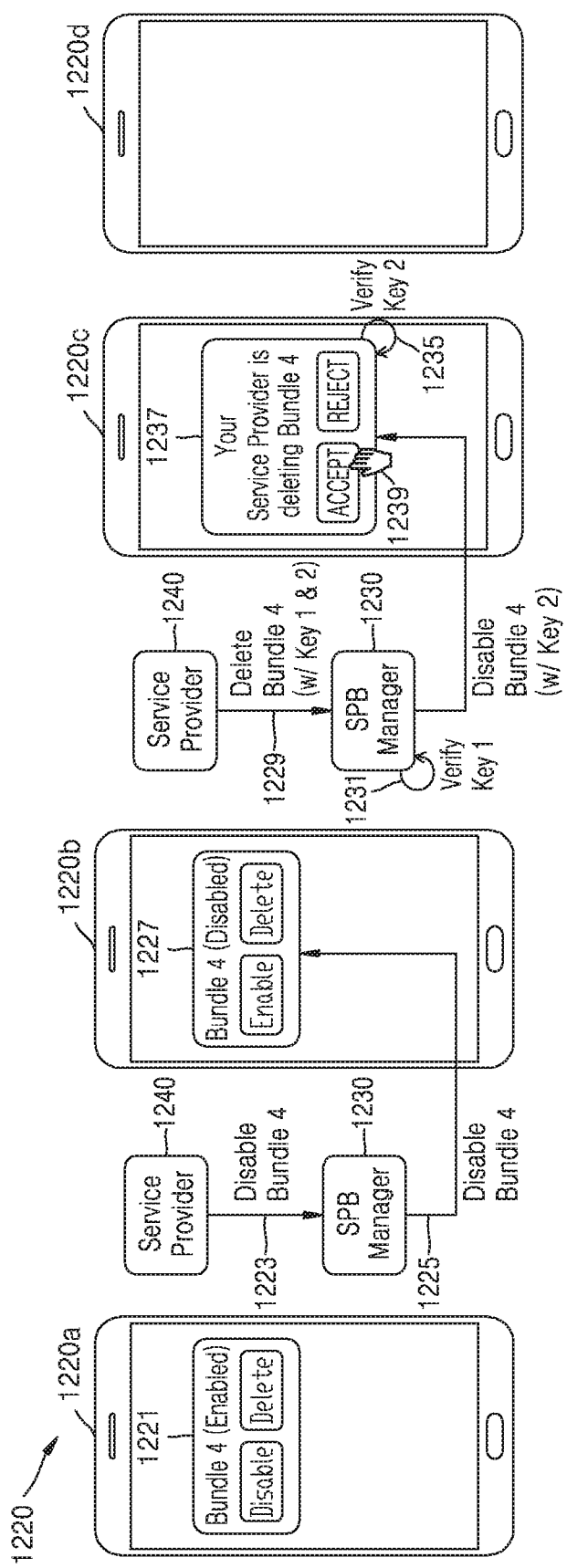
FIG. 12 is a schematic diagram illustrating an example of a procedure in which a user equipment performs bundle local management and bundle remote management, according to an embodiment of the disclosure.

FIG. 12 is a schematic diagram illustrating an example of a procedure in which a user equipment 1220 performs bundle local management and bundle remote management, according to an embodiment of the disclosure.

Referring to FIG. 12, the user equipment 1220 may have a fourth bundle 1211 installed therein. The current embodiment of the disclosure assumes that the fourth bundle 1211 is currently enabled. The fourth bundle 1211 may further include bundle policies 1210. The entirety or a part of the bundle policies 1210 may be included not only in a bundle but also in the user equipment 1220, an LBA (not shown), and/or a bundle management server 1230.

Because the fourth bundle 1211 is configured to be displayed to an end user (see reference numeral 1213) but not to be allowed for local management (see reference numeral 1217), in operation 1221, the fourth bundle 1211 may be displayed on an LBA configuration screen 1220a of the user equipment 1220 and a disable/delete operation 1215 thereof may be inactivated not to be selected by the end user.

In operation 1223, a service provider 1240 may request the bundle management server 1230 to remotely disable the fourth bundle 1211. In operation 1225, the bundle management server 1230 may request the user equipment 1220 to remotely disable the fourth bundle 1211. Because a remote management configuration 1219 of the fourth bundle 1211 does not require an end user consent and a subscriber intent verification for a disable operation, in operation 1227, the fourth bundle 1211 may be displayed as being disabled on an LBA configuration screen 1220b of the user equipment 1220 without an additional operation of the bundle management server 1230 or the end user after operation 1225.

In operation 1229, the service provider 1240 may request the bundle management server 1230 to remotely delete the fourth bundle 1211. Because the remote management configuration 1219 of the fourth bundle 1211 requires a subscriber intent verification such as a credential key verification for a remote delete operation, operation 1229 may further use a first key to be verified by the bundle management server 1230 and/or a second key to be verified by the user equipment 1220, to remotely delete the fourth bundle 1211.

In operation 1231, the bundle management server 1230 may verify a subscriber intent by verifying the first key provided by the service provider 1240. When the first key is valid, in operation 1233, the bundle management server 1230 may request the user equipment 1220 to remotely delete the fourth bundle 1211. Because the remote management configuration 1219 of the fourth bundle 1211 requires a subscriber intent verification such as a credential key verification for a remote delete operation, operation 1233 may further use the second key to be verified by the user equipment 1220, to remotely delete the fourth bundle 1211. Although the second key is provided by the service provider 1240 in FIG. 12, the second key may be generated by the bundle management server 1230 as necessary.

In operation 1235, the user equipment 1220 may verify the subscriber intent by verifying the second key provided by the bundle management server 1230. When the second key is valid, because the remote management configuration 1219 of the fourth bundle 1211 requires an end user consent for a remote delete operation, in operation 1237, an LBA configuration screen 1220c of the user equipment 1220 may request an end user consent by outputting a screen for selecting "Accept/Reject". The operation of requesting the end user consent by outputting the screen for selecting "Accept/Reject" in operation 1237 may be substituted by an operation of requesting a PIN or biometric information (e.g., fingerprint/iris information) of the end user, based on the configuration of the bundle policies 1210.

The operation of verifying the first key and the second key in operations 1231 and 1235 may be substituted by an operation of verifying a digital signature and/or a token including the digital signature (e.g., a signed token), based on the configuration of the bundle policies 1210. The subscriber intent verification may not be performed by both of the bundle management server 1230 and the user equipment 1220, and may be performed only by one of the two as necessary. Operations 1231 and 1235 may further include one or more message exchanges. For example, in operation 1231, when the service provider 1240 does not transmit the first key and/or the second key to request to remotely delete the fourth bundle 1211, the bundle management server 1230 may request and additionally receive the first key and/or the second key from the service provider 1240 to perform the subscriber intent verification based on the remote management configuration 1219. Likewise, in operation 1233, when the bundle management server 1230 does not transmit the first key and/or the second key to request to remotely delete the fourth bundle 1211, the user equipment 1220 may request and additionally receive the first key and/or the second key from the bundle management server 1230 to perform the subscriber intent verification based on the remote management configuration 1219.

In operation 1239, the end user may accept that the fourth bundle 1211 is to be remotely deleted. Thereafter, the user equipment 1220 may remotely delete the fourth bundle 1211. When no more bundle is left in the user equipment 1220, an LBA configuration screen 1220*d* of the user equipment 1220 may display no bundle.

Figure 13:
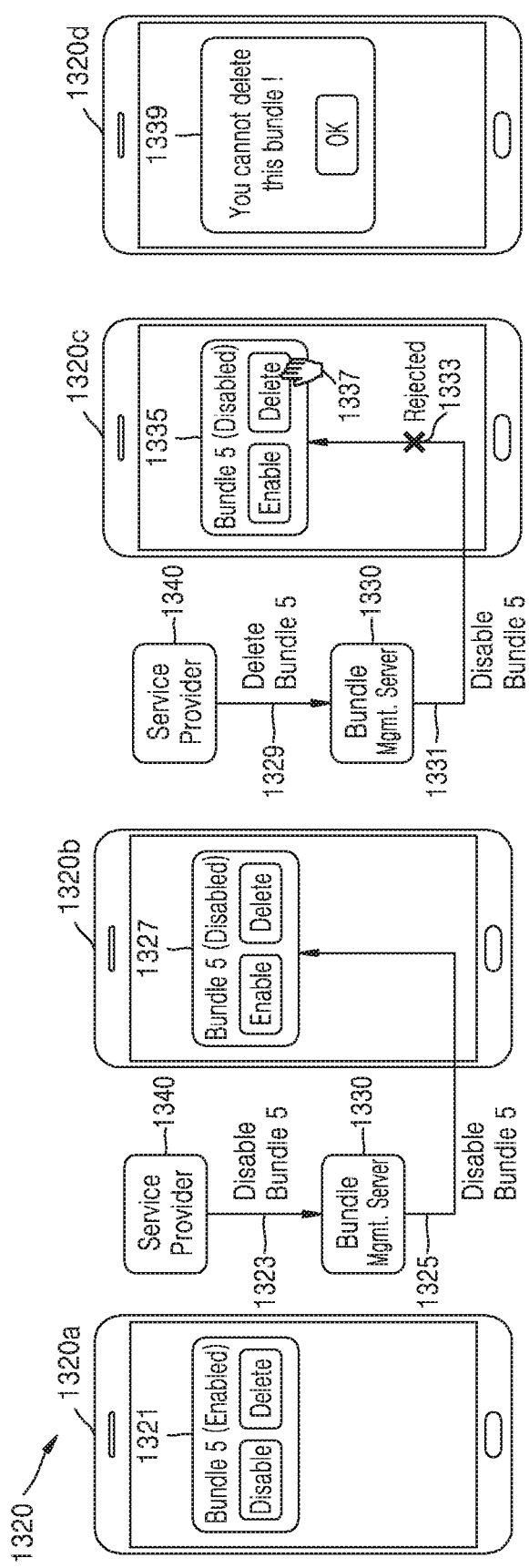
FIG. 13 is a schematic diagram illustrating another example of a procedure in which a user equipment performs bundle local management and bundle remote management, according to an embodiment of the disclosure.

FIG. 13 is a schematic diagram illustrating another example of a procedure in which a user equipment 1320 performs bundle local management and bundle remote management, according to an embodiment of the disclosure.

Referring to FIG. 13, the user equipment 1320 may have a fifth bundle 1311 installed therein. The current embodiment of the disclosure assumes that the fifth bundle 1311 is currently enabled. The fifth bundle 1311 may further include bundle policies 1310. The entirety or a part of the bundle policies 1310 may be included not only in a bundle but also in the user equipment 1320, an LBA (not shown), and/or a bundle management server 1330.

The fifth bundle 1311 may be configured to be displayed to an end user (see reference numeral 1313) and to be allowed for enable and disable operations 1315 of local management (see reference numeral 1317). In this case, in operation 1321, the fifth bundle 1311 may be displayed on an LBA configuration screen 1320*a* of the user equipment 1320 and, unlike the embodiment of FIG. 12 in which non-allowed local management operations are inactivated for the end user, not only the disable operation but also a non-allowed delete operation may be displayed as being allowed to the end user. A process for the non-allowed delete operation will be described below in relation to operation 1339.

In operation 1323, a service provider 1340 may request the bundle management server 1330 to remotely disable the fifth bundle 1311. In operation 1325, the bundle management server 1330 may request the user equipment 1320 to remotely disable the fifth bundle 1311. Because a remote management configuration 1319 of the fifth bundle 1311 does not require an end user consent and a subscriber intent verification for a remote disable operation, in operation 1327, the fifth bundle 1311 may be displayed as being disabled on an LBA configuration screen 1320*b* of the user equipment 1320 without an additional operation of the bundle management server 1330 or the end user after operation 1325.

In operation 1329, the service provider 1340 may request the bundle management server 1330 to remotely delete the fifth bundle 1311. In operation 1331, the bundle management server 1330 may request the user equipment 1320 to remotely delete the fifth bundle 1311. Because the remote management configuration 1319 of the fifth bundle 1311 does not allow the remote delete operation, in operation 1333, the user equipment 1320 may reject to remotely delete the fifth bundle 1311. Although the user equipment 1320 rejects a remote management command in FIG. 13, when the bundle management server 1330 knows of the bundle policies 1310 and a current state of the fifth bundle 1311, the bundle management server 1330 may also reject the remote management command of operation 1329. When the bundle management server 1330 rejects the remote management command, operation 1333 may not be unnecessarily performed.

Because the remote delete operation of the fifth bundle 1311 is rejected, in operation 1335, the fifth bundle 1311 may be continuously displayed as being disabled on an LBA configuration screen 1320*c* of the user equipment 1320. In operation 1337, the end user may attempt to locally delete the fifth bundle 1311.

Because a local management configuration 1317 of the fifth bundle 1311 does not allow the local delete operation, in operation 1339, an LBA configuration screen 1320*d* of the user equipment 1320 may display, to the end user, that the delete operation of the fifth bundle 1311 is not allowed.

Although the local or remote management command of the fifth bundle 1311 is rejected by the bundle management server 1330 or the user equipment 1320 when the bundle policies 1310 do not allow the local or remote management command in operation 1329, 1333, or 1339 of FIG. 13, the local or remote management command of the fifth bundle 1311 may be equally rejected when a result of checking the bundle policies 1310 indicates that an end user intent confirmation, an end user consent, and/or a subscriber intent verification fails. For example, when verification of the key fails in operation 1231 or 1235 of FIG. 12, the remote management command may be rejected as in operation 1333 or 1335 of FIG. 13. As another example, when verification of the PIN of the end user fails in operation 1033 of FIG. 10, the local management command may be rejected as in operation 1339 of FIG. 13.

Although bundle policies are described as information stored in each bundle in the afore-described embodiments of the disclosure, the entirety or a part of the bundle policies may be stored in a user equipment (more specifically, an SSP, an SPBL, or an LBA) as necessary. For example, among the bundle policies, a means for an end user intent confirmation and a means for an end user consent may be stored in the LBA, a means for determining whether local and remote management commands are allowed and a means for a subscriber intent verification may be stored in the SSP, and the other bundle policies may be stored in the bundle. When the entirety or a part of the bundle policies are all stored in the user equipment and the bundle, and when the bundle policies stored in the user equipment differ from the bundle policies stored in the bundle, the user equipment may reject to install the bundle, accept to install but give a priority of application to the bundle policies stored in the user equipment compared to the bundle policies stored in the bundle, or accept to install but give a priority of application to the bundle policies stored in the bundle compared to the bundle policies stored in the user equipment.

When means for an end user intent confirmation, an end user consent, and a subscriber intent verification are specified in the bundle policies, the means may not always be input means supported by the user equipment, a bundle management server, and/or a service provider. For example, a bundle policy requiring a fingerprint input to check an end user consent may be configured for a user equipment having no fingerprint reader. As another example, a bundle policy requiring a digital certificate and a digital signature to verify a subscriber intent may be configured for a service provider having no digital certificate. When the capabilities of the user equipment, the bundle management server, and/or the service provider conflict with the requirements of the bundle policies as described above, the device or the bundle management server may reject to perform the bundle policies, regard the bundle policies as being successfully performed (unconditional success), or substitute the bundle policies with other means. For example, the user equipment may substitute the fingerprint input with a PIN (or PIN code) input, and the bundle management server may substitute the digital signature with a credential key. To prevent the conflict between the capabilities of the user equipment, the bundle management server, and/or the service provider and the bundle policies, the capabilities of the user equipment, the bundle management server, and/or the service provider may be considered to configure the bundle policies. For example, for an operation for installing an arbitrary bundle, the user equipment, the bundle management server, and the service provider may negotiate and check capabilities thereof in advance, and configure bundle policies to use means supported by the three. The above-described example will now be described with reference to FIGS. 14A and 14B.

Figure 14A:
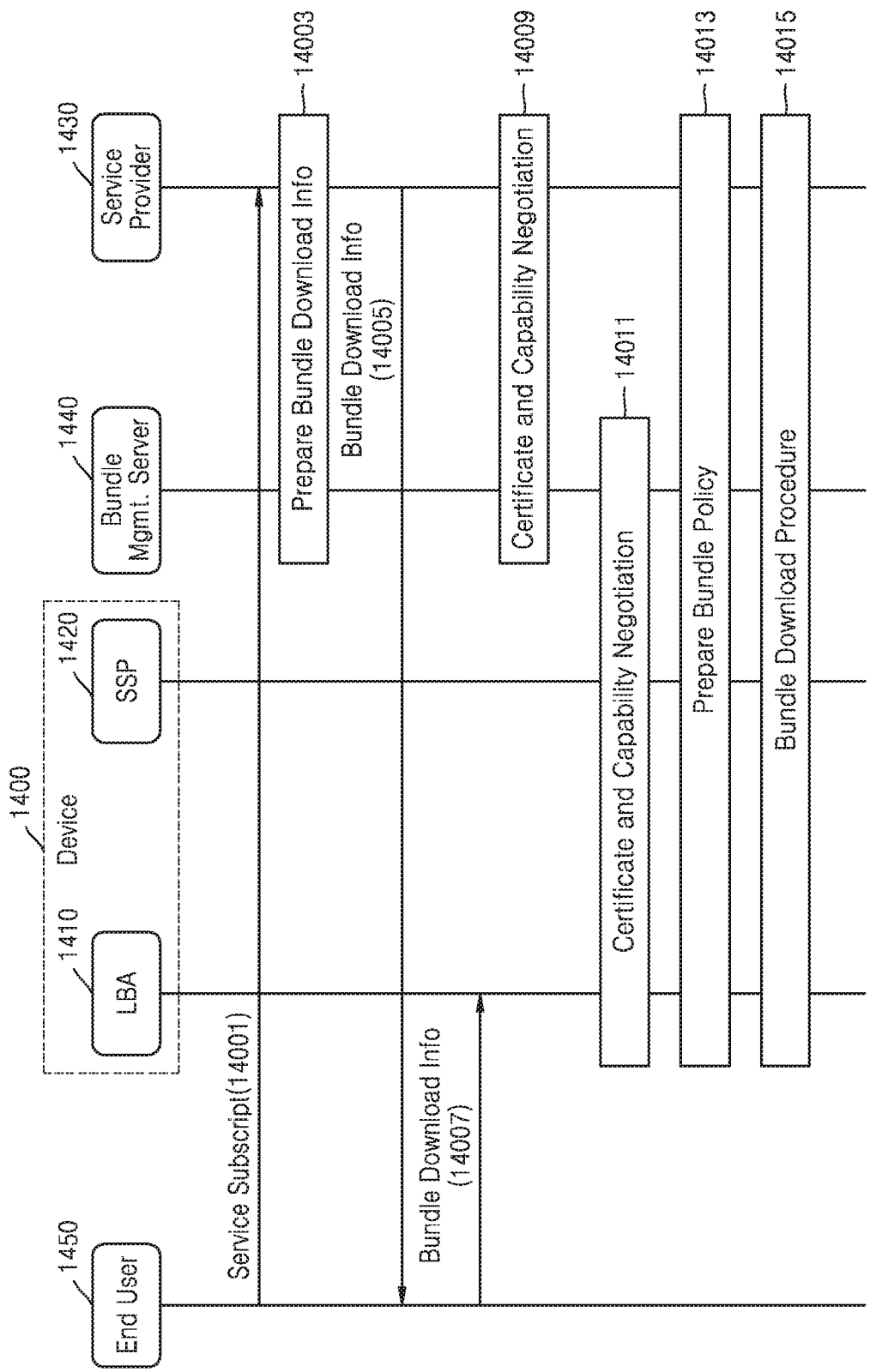
FIG. 14A is a schematic diagram illustrating an example of a procedure in which a user equipment, a bundle management server, and a service provider configure bundle policies, according to an embodiment of the disclosure.

FIG. 14A is a schematic diagram illustrating an example of a procedure in which a user equipment 1400, a service provider 1430, and a bundle management server 1440 configure bundle policies based on capability negotiation, according to an embodiment of the disclosure.

Referring to FIG. 14A, in operation 14001, an end user 1450 may subscribe to a service of the service provider 1430.

In operation 14003, the service provider 1430 and the bundle management server 1440 may generate bundle download information for downloading an arbitrary bundle.

In operation 14005, the service provider 1430 may provide the bundle download information to the end user 1450.

In operation 14007, the end user 1450 may input the bundle download information to an LBA 1410.

In operation 14009, the bundle management server 1440 and the service provider 1430 may perform certificate and capability negotiation. More specifically, in operation 14009, the bundle management server 1440 and the service provider 1430 may exchange digital certificate (or CI certificate) information to be used in a bundle download and installation procedure, and exchange information about means usable for an end user intent confirmation, an end user consent, and a subscriber intent verification. Operation 14009 may be performed immediately after or integrally with operation 14003 as necessary.

In operation 14011, the LBA 1410 and an SSP 1420 in the user equipment 1400 may perform certificate and capability negotiation with the bundle management server 1440. More specifically, in operation 14011, the user equipment 1400 and the bundle management server 1440 may exchange the digital certificate (or CI certificate) information to be used in the bundle download and installation procedure, and exchange the information about the means usable for the end user intent confirmation, the end user consent, and the subscriber intent verification. Operation 14011 may not always be performed separately from operation 14009, and be performed integrally with operation 14009 as necessary.

In operation 14013, the user equipment 1400, the bundle management server 1440, and the service provider 1430 may prepare bundle policies. The entirety or a part of the bundle policies may be stored in a bundle, the LBA 1410, the SSP 1420, or the bundle management server 1440. Operation 14013 may not always be performed after operation 14011, and a part of operation 14013 may be performed immediately after or integrally with operation 14009 as necessary. For example, remote management policies of the bundle policies may be configured after the capability negotiation of the bundle management server 1440 and the service provider 1430, and local management policies of the bundle policies may be configured after the capability negotiation of the user equipment 1400 and the bundle management server 1440.

In operation 14015, the user equipment 1400, the bundle management server 1440, and the service provider 1430 may start to download a bundle.

Figure 14B:
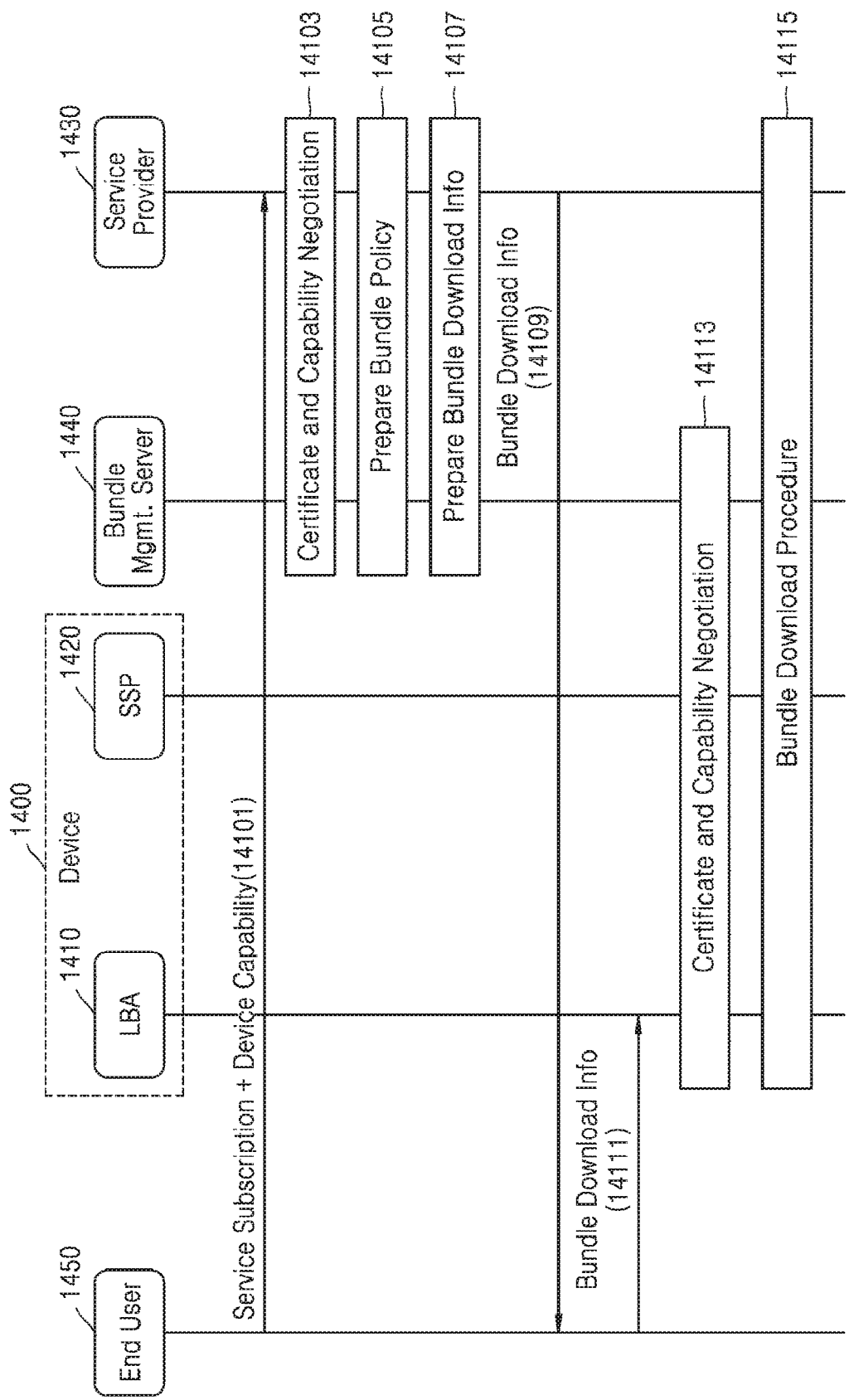
FIG. 14B is a schematic diagram illustrating another example of a procedure in which a user equipment, a bundle management server, and a service provider configure bundle policies, according to an embodiment of the disclosure.

FIG. 14B is a schematic diagram illustrating another example of a procedure in which a user equipment 1400, a service provider 1430, and a bundle management server 1440 configure bundle policies based on capability negotiation, according to an embodiment of the disclosure.

Referring to FIG. 14B, in operation 14101, an end user 1450 may subscribe to a service of the service provider 1430. Although not shown in FIG. 14B, in operation 14101, the end user 1450 may receive capability information of the user equipment 1400 from the user equipment 1400, and provide the capability information of the user equipment 1400 to the service provider 1430 when subscribing to the service. The capability information of the user equipment 1400 may further include information about means usable by the user equipment 1400 for an end user intent confirmation, an end user consent, and a subscriber intent verification. Although the capability information of the user equipment 1400 is transmitted from the end user 1450 to the service provider 1430 in FIG. 14B, the capability information of the user equipment 1400 may be directly transmitted from the user equipment 1400 to the service provider 1430 or the bundle management server 1440. For example, the end user 1450 subscribes to the service of the service provider 1430 by accessing the service provider 1430 or the bundle management server 1440 by using the user equipment 1400, the user equipment 1400 may transmit the capability information of the user equipment 1400 to the service provider 1430 or the bundle management server 1440 as a part of the service subscription procedure.

In operation 14103, the bundle management server 1440 and the service provider 1430 may perform certificate and capability negotiation. More specifically, in operation 14103, the bundle management server 1440 and the service provider 1430 may exchange digital certificate (or CI certificate) information to be used in a bundle download and installation procedure, and exchange information about means usable for an end user intent confirmation, an end user consent, and a subscriber intent verification. In operation 14103, the capability information of the user equipment 1400, which is received from the end user 1450 in operation 14101, may also be exchanged. Operation 14103 may be performed integrally with operation 14105 as necessary.

In operation 14105, the user equipment 1400, the bundle management server 1440, and the service provider 1430 may prepare bundle policies. The entirety or a part of the bundle policies may be stored in a bundle, an LBA 1410, an SSP 1420, or the bundle management server 1440.

In operation 14107, the service provider 1430 and the bundle management server 1440 may generate bundle download information for downloading an arbitrary bundle. Operation 14107 may be performed before or integrally with operation 14105 as necessary.

In operation 14109, the service provider 1430 may provide the bundle download information to the end user 1450.

In operation 14111, the end user 1450 may input the bundle download information to the LBA 1410.

In operation 14113, the LBA 1410 and the SSP 1420 in the user equipment 1400 may perform certificate and capability negotiation with the bundle management server 1440. More specifically, in operation 14113, the user equipment 1400 and the bundle management server 1440 may exchange the digital certificate (or CI certificate) information to be used in the bundle download and installation procedure, and exchange the information about the means usable for the end user intent confirmation, the end user consent, and the subscriber intent verification. The entirety or a part of operation 14113 may be performed integrally with operation 14101 or 14103 as necessary.

In operation 14115, the user equipment 1400, the bundle management server 1440, and the service provider 1430 may start to download a bundle.

According to an embodiment of the disclosure, a user equipment and a bundle management server may configure bundle policies based on capabilities thereof. When a certain bundle is locally or remotely managed, a consent or a verification of an end user and/or a service subscriber may be checked based on bundle policies, and then the local or remote management may be accepted or rejected.

Figure 15:
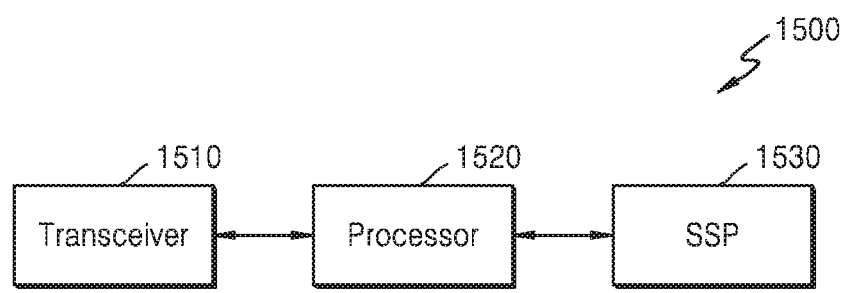
FIG. 15 is a block diagram illustrating a user equipment according to an embodiment of the disclosure.

FIG. 15 is a block diagram of a user equipment 1500 according to an embodiment of the disclosure.

As illustrated in FIG. 15, the user equipment 1500 may include a transceiver 1510 and at least one processor 1520. The user equipment 1500 may further include an SSP 1530. For example, the SSP 1530 may be an rSSP inserted into the user equipment 1500, or an eSSP or iSSP embedded in the user equipment 1500. The at least one processor 1520 may also be called a controller.

However, the user equipment 1500 is not limited to the elements illustrated in FIG. 15, and may include a larger or smaller number of elements compared to those illustrated in FIG. 15. According to an embodiment of the disclosure, the transceiver 1510, the at least one processor 1520, and a memory (not shown) may be configured as a single chip. When the SSP 1530 is embedded, the single chip may further include the SSP 1530.

According to an embodiment of the disclosure, the transceiver 1510 may transmit and receive, to and from a bundle management server, signals, information, and data according to various embodiments of the disclosure. The transceiver 1510 may include a radio-frequency (RF) transmitter for up-converting a frequency of and amplifying a signal to be transmitted, and an RF receiver for low-noise-amplifying and down-converting a frequency of a received signal. However, the RF transmitter and the RF receiver are merely examples and the elements of the transceiver 1510 are not limited thereto. The transceiver 1510 may receive a signal through a wireless channel and output the signal to the at least one processor 1520, and transmit a signal output from the at least one processor 1520, through a wireless channel.

According to an embodiment of the disclosure, the transceiver 1510 may receive, from the bundle management server, at least a message related to bundle installation, or a message including a bundle remote management request. The transceiver 1510 may transmit a bundle installation result or a bundle remote management result.

The at least one processor 1520 is an element for controlling the user equipment 1500. The processor 1520 may control overall operations of the user equipment 1500 according to the afore-described embodiments of the disclosure.

According to an embodiment of the disclosure, the processor 1520 may compare a received bundle package or a bundle remote management command to bundle policies to determine whether the bundle package or the bundle remote management command is processable by the SSP 1530, and input the bundle package or the bundle remote management command to the SSP 1530, and the SSP 1530 may install or manage a bundle, and generate a bundle installation result or a remote management result.

According to an embodiment of the disclosure, the at least one processor 1520 may compare a bundle local management command received from an end user to the bundle policies to determine whether the bundle local management command is processable by the SSP 1530, and input the bundle local management command to the SSP 1530, and the SSP 1530 may install or manage a bundle, and generate a local management result.

According to an embodiment of the disclosure, the at least one processor 1520 may control the transceiver 1510 to receive a bundle or a bundle remote management command from a profile server, install the bundle or process the bundle remote management command, and transmit a bundle installation result or a remote management result to the bundle management server.

The SSP 1530 according to various embodiments of the disclosure may download and install a bundle. The SSP 1530 may manage the bundle and the bundle policies.

According to an embodiment of the disclosure, the SSP 1530 may operate under the control of the processor 1520. Alternatively, the SSP 1530 may include a processor or a controller for installing a bundle, or have installed therein an application for installing a bundle. A part of the application may be installed in the processor 1520.

The user equipment 1500 may further include a memory (not shown) for storing data such as basic programs, application programs, or configuration information for operating the user equipment 1500. The memory may include at least one of flash memory, a hard disk, a multimedia card micro, a memory card (e.g., a secure digital (SD) or extreme digital (XD) card), magnetic memory, a magnetic disc, an optical disc, random access memory (RAM), static RAM (SRAM), read-only memory (ROM), programmable ROM (PROM), or electrically erasable programmable ROM (EEPROM). The processor 1520 may perform various operations by using various programs, contents, and data stored in the memory.

Figure 16:
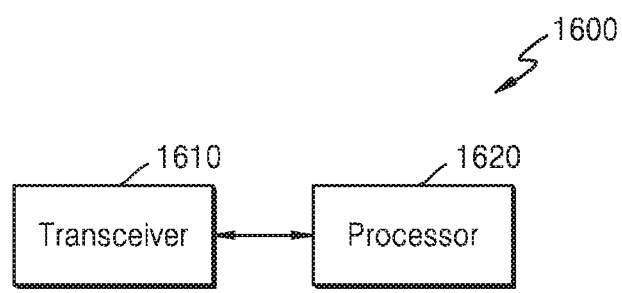
FIG. 16 is a block diagram illustrating a bundle management server according to an embodiment of the disclosure.

FIG. 16 is a block diagram of a bundle management server 1600 according to an embodiment of the disclosure.

According to an embodiment of the disclosure, the bundle management server 1600 may include a transceiver 1610 and at least one processor 1620. However, the bundle management server 1600 is not limited to the elements illustrated in FIG. 16, and the bundle management server 1600 may include a larger or smaller number of elements compared to those illustrated in FIG. 16. According to an embodiment of the disclosure, the transceiver 1610, the at least one processor 1620, and a memory (not shown) may be configured as a single chip.

According to an embodiment of the disclosure, the transceiver 1610 may transmit and receive, to and from the user equipment 1500 (see FIG. 15), signals, information, and data according to various embodiments of the disclosure. For example, the transceiver 1610 may transmit and/or receive, to and/or from the user equipment 1500, bundle information or information related to bundle remote management.

The transceiver 1610 may include an RF transmitter for up-converting a frequency of and amplifying a signal to be transmitted, and an RF receiver for low-noise-amplifying and down-converting a frequency of a received signal. However, the RF transmitter and the RF receiver are merely examples and the elements of the transceiver 1610 are not limited thereto. The transceiver 1610 may receive a signal through a wireless channel and output the signal to the at least one processor 1620, and transmit a signal output from the at least one processor 1620, through a wireless channel.

According to an embodiment of the disclosure, the transceiver 1610 may receive a bundle download request message or a bundle remote management request message from the user equipment 1500.

The bundle download request message or the bundle remote management request message according to an embodiment of the disclosure may include information about the user equipment 1500 and/or the SSP 1530 (see FIG. 15), and may further include the entirety or a part of bundle information or bundle policy information.

For example, the transceiver 1610 according to an embodiment of the disclosure may transmit a bundle installation package or a bundle remote management command to the user equipment 1500.

The bundle installation package or the bundle remote management command according to an embodiment of the disclosure may further include the entirety or a part of the bundle information or the bundle policy information.

The at least one processor 1620 is an element for controlling the bundle management server 1600. The processor 1620 may control overall operations of the bundle management server 1600 according to the afore-described embodiments of the disclosure.

For example, the at least one processor 1620 according to an embodiment of the disclosure determine bundle policies based on the information about the user equipment 1500 and/or the SSP 1530, which is received from the user equipment 1500, and control the transceiver 1610 to transmit the bundle installation package or the bundle remote management command to the user equipment 1500, based on the bundle policies.

The bundle management server 1600 may further include a memory (not shown) for storing data such as basic programs, application programs, or configuration information for operating the bundle management server 1600. The memory may include at least one of flash memory, a hard disk, a multimedia card micro, a memory card (e.g., an SD or XD card), magnetic memory, a magnetic disc, an optical disc, RAM, SRAM, ROM, PROM, or EEPROM. The processor 1620 may perform various operations by using various programs, contents, and data stored in the memory.

In the afore-described embodiments of the disclosure, each element included in the disclosure is expressed in a singular or plural form based on a specific embodiment of the disclosure. However, the singular or plural form is appropriately selected for a specific situation for convenience of explanation and does not limit the scope of the disclosure, and an element expressed in a plural form may represent a singular element and an element expressed in a singular form may represent plural elements.

While the disclosure has been particularly shown and described with reference to embodiments thereof, it will be understood that various changes may be made therein without departing from the scope of the disclosure. Therefore, the scope of the disclosure should not be limited to the afore-described embodiments of the disclosure but be defined by the following claims and equivalents thereof.

It should be understood that various embodiments of the disclosure and terms used herein are not intended to limit the disclosed technologies to particular forms but, on the contrary, cover various modifications, equivalents, and/or alternatives thereof. In the drawings, like reference numerals denote like elements. As used herein, the singular forms "a", "an", and "the" are intended to include the plural forms as well, unless the context clearly indicates otherwise. Throughout the disclosure, the expression "A or B", "at least one of A and/or B", "A, B or C", or "at least one of A, B and/or C" may include all possible combinations of the listed items. The expressions such as "first", "second", "$1^{st}$", and "$2^{nd}$" used herein may refer to various different elements regardless of the order or priority thereof, and are merely used to distinguish one element from another without limiting the elements. When a certain element (e.g., a first element) is referred to as being "(functionally or communicatively) connected" or "coupled" to another element (e.g., a second element), the certain element may be connected to the other element directly or via still another element (e.g., a third element).

As used herein, the term "module" may include a unit configured as hardware, software, or firmware, and be used interchangeably with, for example, the term "logic", "logic block", "component", or "circuit. A module may be an integrated component, the smallest unit which performs one or more functions, or a part thereof. For example, the module may be configured as an application-specific integrated circuit (ASIC).

Various embodiments of the disclosure may be implemented by a software (e.g., a program) including instructions stored in a machine-readable (e.g., computer-readable) storage medium (e.g., embedded or external memory). The machine refers to a device capable of fetching instructions stored in the storage medium, and operating based on the fetched instructions, and may include the user equipment 1500 according to various embodiments of the disclosure. When the instructions are executed by a processor (e.g., the processor 1520 of FIG. 15), functions corresponding to the instructions may be performed directly by the processor or by other elements under the control of the processor. The instructions may include codes created or executed by a compiler or an interpreter.

The machine-readable storage medium may be provided in the form of a non-transitory storage medium. When a storage medium is 'non-transitory', it means that the storage medium is tangible but does not include signals (e.g., electromagnetic waves), and it does not limit that data is semi-permanently or temporarily stored in the storage medium.

According to an embodiment of the disclosure, services may be effectively provide in a mobile communication system.

The methods according to various embodiments of the disclosure may be included and provided in a computer program product. The computer program product may be traded between a seller and a buyer. The computer program product may be distributed in the form of a machine-readable storage medium (e.g., a compact disc-read only memory (CD-ROM)), or be distributed online via an application store (e.g., Google Play™). When distributed online, at least a part of the computer program product may be at least temporarily stored or created in a storage medium such as a server of a manufacturer, a server of an application store, or memory of a relay server. Each element (e.g., a module or a program) according to various embodiments of the disclosure may be configured as singular or plural entities, and some of the above-described sub-elements may be omitted or new sub-elements may be added. Alternatively or additionally, some elements (e.g., modules or programs) may be integrated into one element, and may equally or similarly perform functions of each of the individual elements before being integrated. Operations of modules, programs, or other elements according to various embodiments of the disclosure may be performed sequentially, in parallel, repeatedly, or heuristically, and at least some operations may be omitted or be performed in a different order or other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
   identifying, by a local bundle assistant (LBA) of the terminal, information on an end user selection for performing a management procedure associated with at least one secondary platform bundle (SPB) installed in a smart secure platform (SSP);
   identifying, by the LBA of the terminal, information on an end user intent, in case that information in bundle metadata indicates that the end user intent is required to perform the management procedure associated with the at least one SPB; and
   performing, through the LBA, the management procedure associated with the at least one SPB based on the identified information on the end user intent,
   wherein the management procedure comprises installing the at least one SPB, enabling the at least one SPB, disabling the at least one SPB, or deleting the at least one SPB,
   wherein the at least one SPB is associated with a telecom SPB, and
   wherein the LBA performs the management procedure via an SPB loader.

2. The method of claim 1, wherein the performing of the management procedure comprises installing the at least one SPB, enabling the at least one SPB, disabling the at least one SPB, or deleting the at least one SPB.

3. The method of claim 1, wherein the information in the bundle metadata comprises a certain string corresponding to the management procedure associated with the at least one SPB.

4. The method of claim 1, wherein:
   the end user intent is determined by biometric information, identification information, or configuration information of an end user.

5. A terminal comprising:
   a transceiver; and
   at least one processor coupled to the transceiver and configured to control to:
      identify, by a local bundle assistant (LBA) of the terminal, information on an end user selection for performing a management procedure associated with at least one secondary platform bundle (SPB) installed in a smart secure platform (SSP),
      identify, by the LBA of the terminal, information on an end user intent, in case that information in bundle metadata indicates that the end user intent is required to perform the management procedure associated with the at least one SPB, and
      perform, through the LBA, the management procedure associated with the at least one SPB based on the identified information on the end user intent,
   wherein the management procedure comprises installing the at least one SPB, enabling the at least one SPB, disabling the at least one SPB, or deleting the at least one SPB,
   wherein the at least one SPB is associated with a telecom SPB, and
   wherein the LBA performs the management procedure via an SPB loader.

6. The terminal of claim 5, wherein the management procedure comprises installing the at least one SPB, enabling the at least one SPB, disabling the at least one SPB, or deleting the at least one SPB.

7. The terminal of claim 5, wherein the information in the bundle metadata comprises a certain string corresponding to the at least one SPB.

8. The terminal of claim 5, wherein:
   the end user intent is determined by biometric information, identification information, or configuration information of an end user.

* * * * *